United States Patent
Osawa et al.

(10) Patent No.: US 8,132,917 B2
(45) Date of Patent: Mar. 13, 2012

(54) PROJECTION TYPE DISPLAY DEVICE WITH A PHASE MODULATING UNIT

(75) Inventors: Mitsuo Osawa, Fukushima (JP); Atsushi Kawamori, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 345 days.

(21) Appl. No.: 12/424,971

(22) Filed: Apr. 16, 2009

(65) Prior Publication Data
US 2009/0257028 A1 Oct. 15, 2009

Related U.S. Application Data

(63) Continuation of application No. PCT/JP2007/070191, filed on Oct. 16, 2007.

(30) Foreign Application Priority Data

Oct. 16, 2006 (JP) ................. 2006-281567
Feb. 8, 2007 (JP) ................. 2007-029647
Jun. 8, 2007 (JP) ................. 2007-152914

(51) Int. Cl.
*G03B 21/14* (2006.01)
*G02F 1/07* (2006.01)
*G02B 5/30* (2006.01)

(52) U.S. Cl. ..... 353/20; 359/251; 359/254; 359/486.01; 349/18

(58) Field of Classification Search ............ 353/20; 359/252, 253, 486.01, 486.03, 489.06, 489.2, 359/490.01, 279, 240, 245, 246, 247, 254, 359/251; 349/193, 194, 18
See application file for complete search history.

(56) References Cited

U.S. PATENT DOCUMENTS

| | | | |
|---|---|---|---|
| 6,421,131 B1 * | 7/2002 | Miller | 356/453 |
| 2006/0023164 A1 * | 2/2006 | Sakaguchi et al. | 353/20 |
| 2006/0023165 A1 * | 2/2006 | Ishihara et al. | 353/20 |

FOREIGN PATENT DOCUMENTS

| | | | |
|---|---|---|---|
| JP | 61-279822 | | 12/1986 |
| JP | 10039267 A | * | 2/1998 |
| JP | 2000-206449 | | 7/2000 |
| JP | 2006-47421 | | 2/2006 |

* cited by examiner

*Primary Examiner* — Thanh X Luu
*Assistant Examiner* — Danell L Owens
(74) *Attorney, Agent, or Firm* — Oblon, Spivak, McClelland, Maier & Neustadt, L.L.P.

(57) ABSTRACT

A projection type display device includes: a light emitting unit that includes at least one light source for emitting a coherent light. An image light generating unit modulates the light emitted by the light emitting unit to generate an image light. A projecting unit projects the image light. A phase modulating unit is arranged either between the light emitting unit and the image light generating unit or between the image light generating unit and the projecting unit and has an area where at least one of a retardation value and an azimuth direction of a slow axis is distributed respectively in different directions or values in a plane orthogonal to an optical axis.

15 Claims, 17 Drawing Sheets

FIG. 3A
FIG. 3B
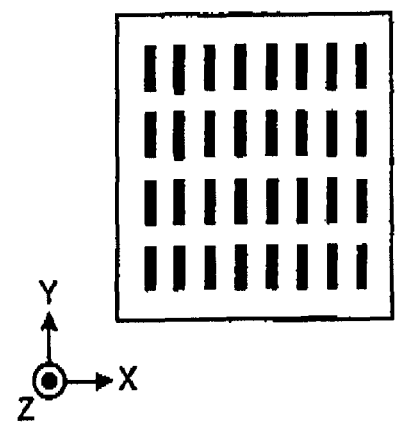
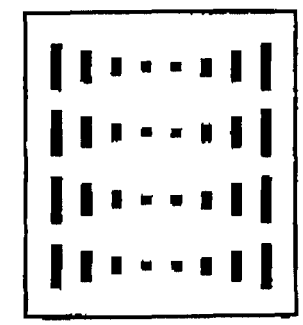
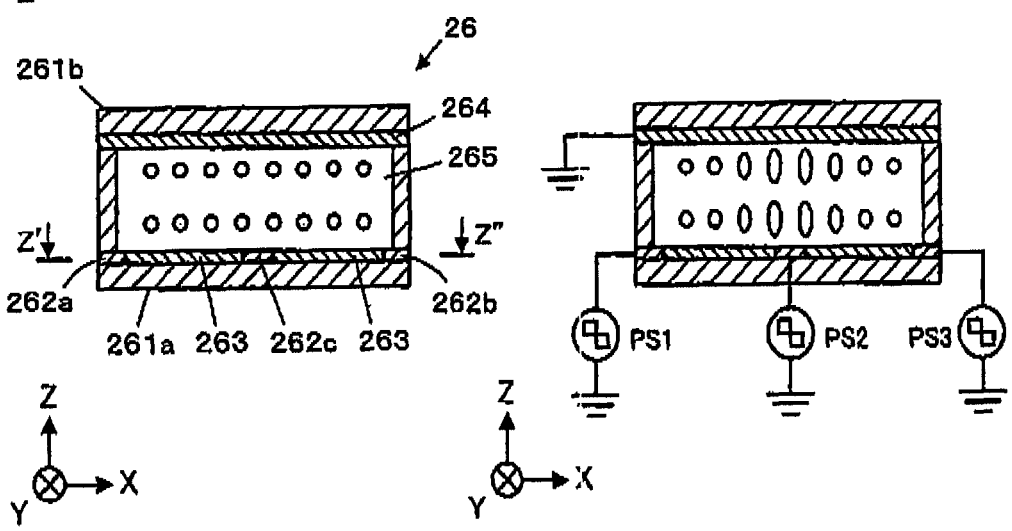
FIG. 3C
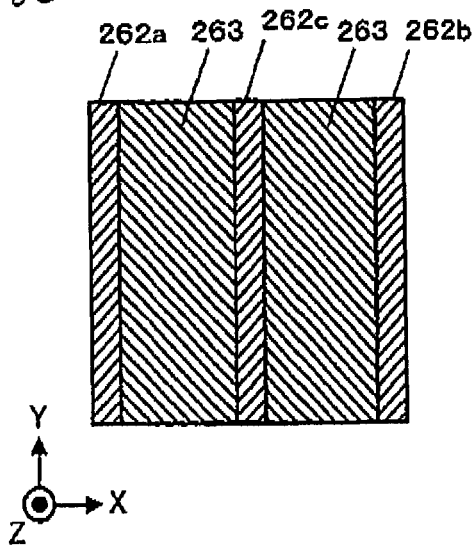

PROJECTION TYPE DISPLAY DEVICE WITH A PHASE MODULATING UNIT

TECHNICAL FIELD

The present invention relates to a projection type display device and more particularly to a projection type display device using a light source having a coherent property.

BACKGROUND ART

As a light source that displays a projected image on a screen such as a data projector or a rear surface projection type television image receiver, an extra-high pressure mercury lamp has been hitherto used, however, in recent years, laser is proposed from the viewpoint of a mono-chromaticity and the life of the light source.

Further, in order to supplement a red color light that is insufficient in the ultra-high pressure mercury lamp, a light source using together the ultra-high pressure mercury lamp and a red color laser is also proposed.

However, when the laser is used as the light source, speckle noise in particles due to the coherent property of a laser beam occurs in the projected image so that the quality of the projected image cannot be avoided from being deteriorated.

JP-A-2000-206449 (patent document 1) and JP-A-2006-047421 (patent document 2) propose a projection type display device that reduces the speckle noise.

FIG. 17 is a block diagram of an image display device disclosed in the patent document 1. Lights outputted from a semiconductor laser 81 are changed to parallel lights by a collimator lens 82, and then, pass through a transparent optical element 83. The transparent optical element 83 is made of optical glass having a refractive index of n and formed in the shape of a stairs of N steps with an depth of Δt.

The lights passing through the transparent optical element 83 pass through a light converging lens 85 via a lens array 84 composed of N elements respectively corresponding to the steps of the transparent optical element 83. The lights passing through the light converging lens 85 are spatially modulated by a spatial modulator 86 and projected on a screen 88 through a projection lens system 87.

Since the lights passing through parts of the transparent optical element 83 respectively include optical path differences mutually integer times as large as Δt, the lights reaching the screen form a collection of the lights whose phases are spatially shifted and a coherence property is deteriorated. Thus, the occurrence of the speckle noise is suppressed.

FIG. 18 is a perspective view of a spatial polarization control element disclosed in the patent document 2 that is formed in a vertical stripe form in which for instance, phase difference plate areas 91 provided with phase difference plates as ½ wavelength plates and transmitting member areas 92 provided with transmitting members are alternately arranged.

Since the speckle noise of the light passing through the phase difference plate areas 91 is not correlated with the speckle noise of the light passing through the transmitting member areas 92, the speckle noise formed on a display screen on which the light passing through the phase difference plate areas 91 is superimposed on the light passing through the transmitting member areas 92 is reduced.

However, in the device disclosed in the patent document 1, when the step Δt is increased in order to provide a sufficient optical path difference, a problem arises that the device itself is enlarged.

Further, in the device disclosed in the patent document 2, since a stray light is generated in the boundary between the phase difference plate area and the transmitting member area, when the areas are finely divided to reduce the speckle noise, a problem arises that the stray lights are increased to deteriorate a contrast of a display image.

DISCLOSURE OF THE INVENTION

It is an object of the present invention to provide a projection type display device that can simply reduce speckle noise when a light source having coherent property is used.

To achieve the above-described object, according to the present invention, a projection type display device is provided which includes: a light emitting unit that includes at least one light source for emitting a coherent light; an image light generating unit that modulates the light emitted by the light emitting unit to generate an image light; a projecting unit that projects the image light; and a phase modulating unit arranged either between the light emitting unit and the image light generating unit or between the image light generating unit and the projecting unit and having an area where at least one of a retardation value and a azimuth direction of a slow axis is distributed respectively in different directions or values in a plane orthogonal to an optical axis.

According to this structure, when the light source having a coherent property is used, the polarization of the coherent light is cancelled so that speckle noise can be reduced.

The phase modulating unit may include a birefringent material layer having the area where the azimuth direction of the slow axis is constant in the plane orthogonal to the optical axis and the retardation value is distributed in different values within a range from a minimum retardation value to a maximum retardation value and a difference between the maximum retardation value and the minimum retardation value may be a wavelength of the coherent light or more.

According to this structure, the polarization of the coherent light can be sufficiently cancelled.

The phase modulating unit may include a birefringent material layer having the area where the azimuth direction of the slow axis is distributed in the different directions in the plane orthogonal to the optical axis.

A projection type display device of the present invention has a structure that the phase modulating unit includes the birefringent material layer in which the azimuth direction of the slow axis is directed to a radial direction or a circumference direction of a concentric circle having the optical axis as a center in the plane orthogonal to the optical axis.

According to this structure, the polarization of the coherent light can be cancelled without depending on a polarizing direction.

The retardation value may be a constant value equal to a value odd number times as large as a half wavelength of the coherent light.

According to this structure, the polarization of the coherent light can be sufficiently cancelled.

The projection type display device may further include: a pair of transparent electrodes that sandwich the birefringent material layer between them. The birefringent material layer may be a liquid crystal layer and have the area where at least one of the azimuth direction and the retardation value of the slow axis is distributed respectively in the different directions or values in the plane orthogonal to the optical axis by a voltage applied to a part between the transparent electrodes from an external part.

The above-described voltage applied to the transparent electrodes may change in time.

According to this structure, the distribution of the retardation values in the plane orthogonal to the optical axis can be changed in time and the speckle noise sensed from a display can be reduced.

The birefringent material layer may be a polymer liquid crystal layer obtained by polymerizing polymerizable liquid crystal compositions in prescribed alignment states.

According to the present invention, an optical phase modulator is provided that includes: an array shaped phase modulation part having an array structure in a plane orthogonal to the optical axis of an incident light to modulate the phase of the incident light by elements of the array structure respectively; and an optical shaping part that divides the incident light into a plurality of light fluxes respectively corresponding to the elements, and then, superposes the plurality of the divided light fluxes on the one light flux. The array shaped phase modulation part includes a birefringent medium in which at least one of an azimuth direction and a retardation value of a slow axis varies in the plane orthogonal to the optical axis of the incident light.

According to this structure, speckle patterns are averaged correspondingly to the number of the elements of the array structure so that the speckle noise can be reduced.

An optical phase modulator may further include: a pair of electrodes that sandwich the birefringent medium between them. The birefringent medium may be a liquid crystal layer in which the retardation value can be changed in time by a voltage applied to a part between the transparent electrodes.

According to this structure, the variation of the speckle pattern is increased in time so that the speckle noise can be reduced.

According to the present invention, a projection type display device is provided that includes: alight emitting unit that includes at least one light source for emitting a coherent light; an image light generating unit that modulates the light emitted by the light emitting unit to generate an image light; a projecting unit that projects the image light; and an optical phase modulator according to a ninth or tenth invention that is arranged either between the light emitting unit and the image light generating unit or between the image light generating unit and the projecting unit.

According to this structure, when the light source having the coherent property is used, the polarization of the coherent light is cancelled so that the speckle noise can be reduced.

BRIEF DESCRIPTION OF THE DRAWINGS

FIGS. 3A to 3C are explanatory views of a phase modulating element according to a second embodiment of the present invention.

BEST MODE FOR IMPLEMENTING THE INVENTION

Now, an embodiment of a projection type display device according to the present invention will be described below by referring to the attached drawings. In this specification, an azimuth direction of a slow axis means a direction of a slow axis projected on a plane orthogonal to an optical axis in the plane.

Figure 1:
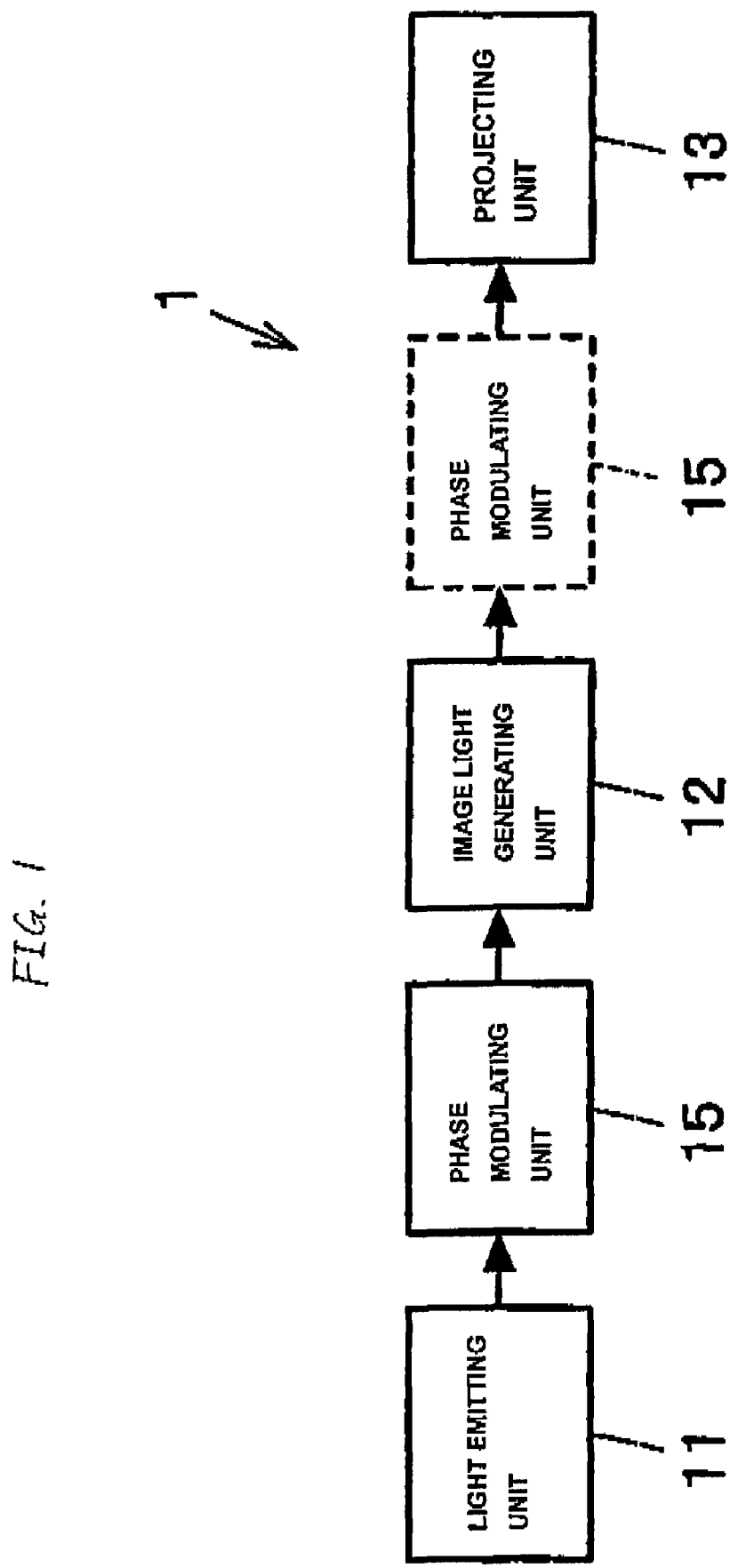
FIG. 1 is a block diagram of a projection type display device according to the present invention.

As shown in FIG. 1, a projection type display device 1 according to the present invention includes a light emitting unit 11 having at least one light source for emitting a coherent light, an image light generating unit that modulates the light emitted by the light emitting unit 11 to generate an image light and a projecting unit that projects the image light.

Then, between the light emitting unit 11 and the image light generating unit 12, or between the image light generating unit 12 and the projecting unit 13, a phase modulating unit 15 is arranged that has an area where at least one of a retardation value R and an azimuth direction $A_d$ of the slow axis is distributed respectively in different directions or values in the plane orthogonal to the optical axis.

The light emitting unit 11 is a light source including a laser light source for outputting the coherent light. The light outputted from the light source is incident on a spatial optical modulator such as a digital micro mirror device (DMD) as the image light generating unit 12 via a phase modulating element 25 as the phase modulating unit 15.

A light flux incident on the spatial optical modulator is modulated in accordance with an image signal and projected on a screen by a projection lens system as the projecting unit 13.

As the light source, may be employed a structure using only one laser light source, a structure in which a plurality of laser light sources for outputting lights of different wavelengths are arranged or a structure using a light source having no coherent property and a laser light source combined therewith.

Further, a lens system that collimates or converges the light flux outputted from the laser light source may be added between the laser light source and a projection lens. Further, the spatial optical modulator may have a structure that directly sweeps and projects the light from the laser light source on the screen as a scanning mirror.

Then, the phase modulating element 25 is an optical element having an area where at least one of a retardation value R and an azimuth direction $A_d$ of a slow axis is distributed respectively in different directions or values in an X-Y plane orthogonal to the optical axis (a Z axis).

That is, the phase modulating element 25 according to the present invention includes three forms as described below.
Form 1: Form that the azimuth direction $A_d$ of the slow axis is constant and the retardation values R are distributed
Form 2: Form that the retardation value R is constant and the azimuth directions $A_d$ of the slow axis are distributed
Form 3: Form that the azimuth directions $A_d$ of the slow axis and the retardation values R are distributed Further, the phase modulating element 25 according to the present invention has a birefringent material layer including an area where at least one of the retardation value R and the azimuth direction $A_d$ of the slow axis is distributed respectively in different directions or values in the X-Y plane orthogonal to the optical axis (the Z axis). As the birefringent material layer, a birefringent material layer composed of a liquid crystal or a polymer liquid crystal can be used between two transparent substrates.

When the liquid crystal is used as a birefringent material, to distribute the azimuth directions $A_d$ of the slow axis can be realized by the direction of an alignment process of an alignment film or a gradient electric field.

To distribute the retardation values R can be realized by distributing voltages to be applied to the liquid crystal layer. Otherwise, the distribution of the retardation values R can be also realized by distributing pre-tilt angles of liquid crystal molecules in the surfaces of the transparent substrates. Here, the pre-tilt angle means an angle formed by the liquid crystal molecule relative to the surface of the substrate when the liquid crystal is homogeneously aligned.

When the polymer liquid crystal is used as the birefringent material, under a state that the retardation value R and the azimuth direction $A_d$ of the slow axis is distributed by the same method, polymerizable liquid crystal compositions are polymerized and solidified so that a desired distribution of the retardation value R or the azimuth direction $A_d$ of the slow axis is obtained. Further, in the polymer liquid crystal, the desired distribution of the retardation value R can be also obtained by distributing the thicknesses of the polymer liquid crystal layer.

As described above, the phase modulating element 25 according to the present invention includes six kinds in total when the liquid crystal or the polymer liquid crystal is respectively used in the above-described three forms. Now, embodiments of the present invention will be described below by using the attached drawings.

First Embodiment

Figure 2A:
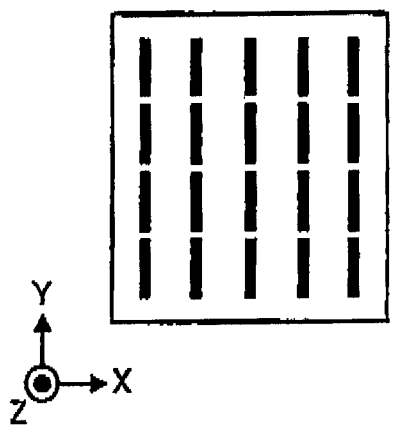
FIGS. 2A to 2C are explanatory views of a phase modulating element according to a first embodiment of the present invention.
Figure 2B:
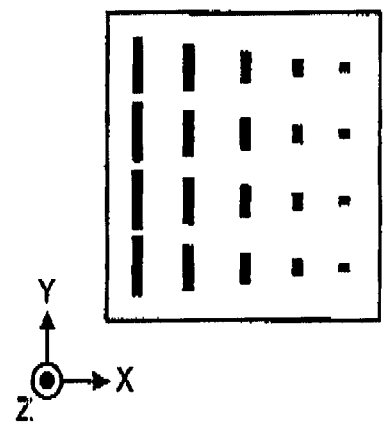
Figure 2B:
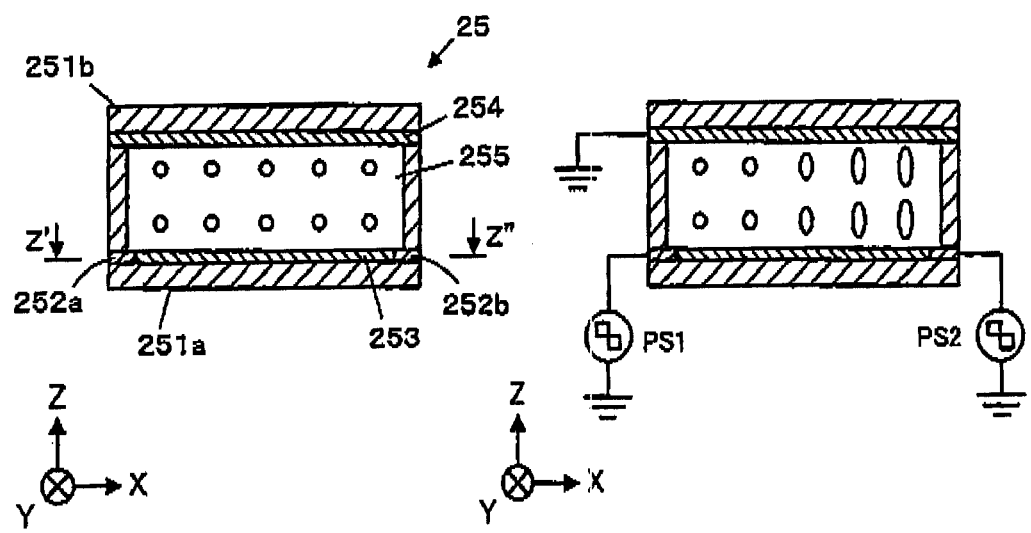
Figure 2C:
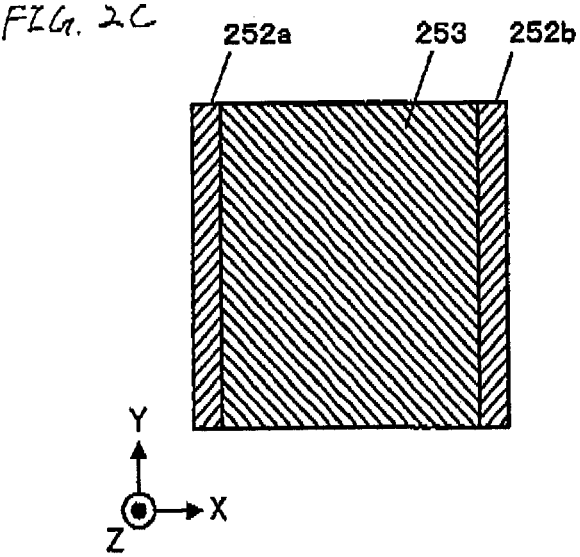

The phase modulating element 25 according to a first embodiment of the present invention is a phase modulating element of a type of the form 1 and includes, as shown in a sectional view of a lower column of FIG. 2A and a Z'-Z" sectional view of FIG. 2C, a first transparent substrate 251a and a second transparent substrate 251b arranged to be opposed to each other and a birefringent material layer 255 composed of a birefringent material and sandwiched between the first transparent substrate 251a and the second transparent substrate 251b.

On one end side of a surface of the first transparent substrate 251a opposed to the birefringent material layer 255, a low resistance electrode 252a as a transparent electrode is formed, and on the other end side, a low resistance electrode 252b is similarly formed. Further, between the low resistance electrodes 252a and 252b, a high resistance electrode 253 is formed. The low resistance electrodes 252a, 252b and the high resistance electrode 253 are electrically connected together.

On the other hand, on a surface of the second transparent substrate 251b opposed to the birefringent material layer 255, an opposed electrode 254 is formed on the entire surface.

As shown in a sectional view of a lower column of FIG. 2B, the low resistance electrode 252a is connected to a terminal of a rectangular wave ac power source PS1 and the low resistance electrode 252b is connected to a terminal of a rectangular wave ac power source PS2. The rectangular wave ac power source PS1, the rectangular wave ac power source PS2 and the opposed electrode 254 are respectively grounded. Then, the rectangular wave ac power sources PS1 and PS2 apply a voltage of the same phase to the low resistance electrodes 252a and 252b.

The first transparent substrate 251a and the second transparent substrate 251b need to be transparent to the wavelength of a light source to be used and glass or plastic or the like can be used.

The high resistance electrode 253 and the opposed electrode 254 need to be transparent to the wavelength of the light source to be used, and electrically conductive oxides can be used such as ITO (indium tin oxide), $SnO_2$ (tin dioxide) doped with antimony or fluorine, ZnO (zinc oxide) doped with aluminum, gallium, indium or the like.

The low resistance electrodes 252a and 252b have resistance values lower than that of the high resistance electrode 253 and can use metal such as chromium, copper nickel, gold, etc. or the electrically conductive oxides such as ITO, $SnO_2$, ZnO, etc.

A ratio $R_L/R_H$ of the sheet resistance $R_L$ of the low resistance electrodes 252a and 252b and the sheet resistance $R_H$ of the high resistance electrode 253 is preferably 1/1000 or lower. When $R_L/R_H$ exceeds 1/1000, a voltage drop in the low resistance electrodes is increased so that a below-described desired gradient electric field cannot be occasionally obtained. Further, when the sheet resistance $R_H$ of the high resistance electrode is excessively high, the gradient electric field is not generated. Thus, the sheet resistance $R_H$ of the high resistance electrode is preferably $10^9 \Omega/\square$ or lower. When the sheet resistance $R_L$ of the low resistance electrodes is lowered as much as possible, the tolerance of the sheet resistance of the high resistance electrode is more widened. Thus, by considering the easiness of a formation of the transparent electrodes or a cost in addition thereto, the sheet resistance $R_L$ of the low resistance electrodes is preferably located within a range of 1 to $50\Omega/\square$. As the low resistance electrode, an ITO film having the sheet resistance of $40\Omega/\square$ is preferably exemplified. As the high resistance electrode, an $SnO_2$ film having the sheet resistance of $100M\Omega/\square$ is preferably exemplified, respectively.

In order to ensure an insulation between the low resistance electrodes 252a, 252b and the high resistance electrode 253 and the opposed electrode 254, at least one of the surfaces of the low resistance electrodes 252a and 252b and the high resistance electrode 253 opposed to the birefringent material layer 255 and the surface opposed electrode 254 opposed to the birefringent material layer 255 may be covered with an insulating film. This insulating film needs to be transparent to the wavelength of the light source to be used, and for instance, can be used an inorganic film composed of an inorganic material such as $SiO_2$ (silicon dioxide) or an organic film composed of an organic material such as acryl.

As a material of the birefringent material layer 255, the liquid crystal is preferably used to improve a degree of freedom in design of the retardation value R.

When the liquid crystal is used as the birefringent material layer 255, on the surfaces of the low resistance electrodes 252a, 252b and the high resistance electrode 254 and the opposed electrode 254 that come into contact with the liquid crystal, a polyimide film may be provided as an alignment film to carry out an alignment process such as rubbing.

Otherwise, a technique of an optical alignment, a technique for obliquely depositing SiO (silicon monoxide) to align and a technique for applying an ion beam to align a diamond like carbon film may be employed. Further, many micro irregular grooves may be provided on the surfaces of the first transparent substrate 251a and the second transparent substrate 251b that come into contact with the liquid crystal so that liquid crystal molecules follow the grooves.

For instance, the above-describe alignment process is carried out in a Y axis direction so that the azimuth direction $A_d$ of the slow axis in the X-Y plane can be set to the Y axis direction.

In upper columns of FIG. 2A and FIG. 2B, plan views are shown in which the birefringent material layer 255 is seen from a Z axis direction. When the voltage is not applied to the birefringent material layer 255 (FIG. 2A) the azimuth direction $A_d$ of the slow axis of the birefringent material layer 255 is constant irrespective of its position. Here, as a material of the birefringent material layer 255, the liquid crystal whose dielectric anisotropy is positive is supposed to be used.

When the rectangular wave ac power sources PS1 and PS2 are connected to the low resistance electrodes 252a and 252b and a voltage higher than that applied to the low resistance electrode 252a is designed to be applied to the low resistance electrode 252b (FIG. 2B), the gradient electric field that is weak in the low resistance electrode 252a side and stronger toward the low resistance electrode 252b is generated between the high resistance electrode 253 and the opposed electrode 254.

The azimuth directions $A_d$ of the slow axes of the liquid crystal molecules in the birefringent material layer 255 show the same directions in the surfaces of the substrates (the X-Y plane), however, in a case that an inclination θ with respect to the direction of the optical axis (the direction of the Z axis) is larger toward the low resistance electrode 252a from the low resistance electrode 252b, the azimuth directions $A_d$ comes to the direction of the alignment process parallel to the X-Y plane.

In the upper columns of FIGS. 2A and 2B, the directions of thick lines represent the azimuth directions $A_d$ of the slow axes in positions of the birefringent material layer 255 respectively, and the lengths of the thick lines represent the levels of the retardation values R.

Namely, the retardation values R of the birefringent material layer 255 are continuously distributed from a retardation value $R_{max}$ of a left end of the substrate in the drawing to a retardation value $R_{min}$ of a right end in accordance with an electric field applied to the direction of the optical axis.

A difference $(R_{max}-R_{min})$ between the retardation value $R_{max}$ and the retardation value $R_{min}$ in an area through which the coherent light passes is desirably the wavelength λ of the coherent light or larger, and preferably two times as long as the wavelength or larger to reduce and cancel the coherent property of the coherent light.

In order to easily manufacture the phase modulating element 25 of the first embodiment and further improve a responsiveness of an alignment control of the liquid crystal, the difference $(R_{max}-R_{min})$ between the retardation value $R_{max}$ and the retardation value R min is desirably 10 times as long as the wavelength λ of the coherent light or smaller and preferably 5 times as long as the wavelength λ of the coherent light or smaller.

Further, when the voltage applied to the liquid crystal layer is switched in time, the distribution of the retardation values in the X-Y plane can be remarkably preferably changed in time.

Further, the polymer liquid crystal manufactured by polymerizing and solidifying the polymerizable liquid crystal compositions that are desirably aligned is carried out by a similar method may be used in place of the above-described liquid crystal.

As described above, in the projection type display device according to the present invention, the phase modulating element is used that include the area where the retardation value is distributed in the different values in the plane orthogonal to the optical axis. Thus, when the light source having the coherent property, speckle noise can be simply reduced.

Further, the phase modulating element according to the present invention may be laminated on other optical parts used in a projection optical system, for instance, a beam shaping device, a light quantity equalizing device, a polarizer or the like and formed integrally therewith, which is very preferable in view of a miniaturization of the projection optical system and an easiness of assembly and adjustment.

Second Embodiment

A phase modulating element 26 according to a second embodiment of the present invention is a phase modulating element of a type of the form 1. Though a description is given by using FIGS. 3A to 3C, parts having the same functions as those of the phase modulating element of the first embodiment shown in FIGS. 2A to 2C are designated by the same reference numerals. The phase modulating element 26 includes, as shown in a sectional view of a lower column of FIG. 3A and a Z'-Z'' sectional view of FIG. 3C, a first transparent substrate 261a and a second transparent substrate 261b arranged to be opposed to each other and a birefringent material layer 265 composed of a birefringent material and sandwiched between the first transparent substrate 261a and the second transparent substrate 261b.

On the first transparent substrate 261a and the second transparent substrate 261b, transparent electrodes are provided so that a voltage can be applied to the birefringent material layer 265. On a surface of the first transparent substrate 261a, low resistance electrodes 262a, 262b and 262c are formed and a high resistance electrode 263 is formed between the low resistance electrodes. On the other hand, on a surface of the second transparent substrate 261b opposed to the birefringent material layer 265, an opposed electrode 264 is formed on the entire surface.

Rectangular wave ac power sources PS1, PS2 and PS3 are respectively connected to the low resistance electrodes 262a, 262b and 262c and the rectangular wave ac power sources PS1, PS2 and PS3 and the opposed electrode 264 are grounded. Then, the rectangular wave ac power sources PS1, PS2 and PS3 are supposed to transmit signals of the same phase to the low resistance electrodes 262a, 262b and 262c. Other conditions are the same as those of the type of the form 1 of the first embodiment.

When the rectangular wave ac power sources PS1, PS2 PS3 are respectively connected to the low resistance electrodes 262a, 262b and 262c and a voltage higher than that applied to the low resistance electrodes 262a and 262b is designed to be applied to the low resistance electrode 262c (FIG. 3B), an electric field generated between the high resistance electrode 263 and the opposed electrode 264 includes a gradient electric field that is stronger toward the low resistance electrode 262c from the low resistance electrode 262a side and a gradient electric field that is stronger toward the low resistance electrode 262c from the low resistance electrode 262b side.

The azimuth directions $A_d$ of slow axes of liquid crystal molecules in the birefringent material layer 265 show the same directions in the surfaces of the substrates (an X-Y plane), however, inclinations θ in the directions of major axes of the liquid crystal molecules with respect to the direction of an optical axis (a direction of a Z axis) are smaller toward the low resistance electrode 262c from the low resistance electrode 262a and larger toward the low resistance electrode 262b from the low resistance electrode 262c.

Retardation values R of the birefringent material layer 265 are continuously distributed from a retardation value $R_{max}$ of a left end of the substrate in an upper column of FIG. 3B to a retardation value $R_{min}$ in a central part, and from the retardation value R $R_{min}$ in the central part to a retardation value $R_{max}$ of a right end of the substrate in accordance with an electric field applied to the direction of the optical axis.

Third Embodiment

Figure 4A:
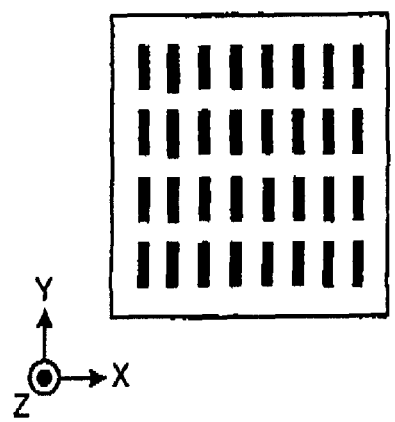
FIGS. 4A to 4C are explanatory views of a phase modulating element according to a third embodiment of the present invention.

A phase modulating element 27 according to a third embodiment of the present invention is a phase modulating element of a type of the form 1. Though a description is given by using FIGS. 4A to 4C, parts having the same functions as those of the phase modulating element of the first embodiment shown in FIGS. 2A to 2c are designated by the same reference numerals. The phase modulating element 27 includes, as shown in a sectional view of a lower column of FIG. 4A and a Z'-Z" sectional view of FIG. 4C, a first transparent substrate 271a and a second transparent substrate 271b arranged to be opposed to each other and a birefringent material layer 275 composed of a birefringent material and sandwiched between the first transparent substrate 271a and the second transparent substrate 271b.

On the first transparent substrate 271a and the second transparent substrate 271b, transparent electrodes are provided so that a voltage can be applied to the birefringent material layer 25. On a surface of the first transparent substrate 271a, low resistance electrodes 272a, 272b, 272c and 272d are formed. On the other hand, on a surface of the second transparent substrate 271b opposed to the birefringent material layer 275, an opposed electrode 274 is formed on the entire surface.

Rectangular wave ac power sources PS1, PS2, PS3 and PS4 are respectively connected to the low resistance electrodes 272a, 272b, 272c and 272d and the rectangular wave ac power sources PS1, PS2, PS3 and PS4 and the opposed electrode 274 are grounded. Then, the rectangular wave ac power sources PS1, PS2, PS3 and PS4 are supposed to transmit signals of the same phase to the low resistance electrodes 272a, 272b, 272c and 272d. Other conditions are the same as those of the type of the form 1 of the first embodiment.

Figure 4B:
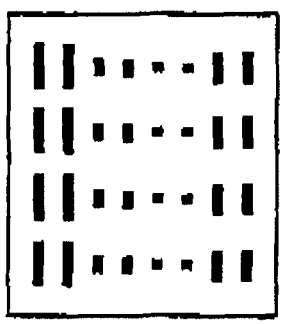
Figure 4B:
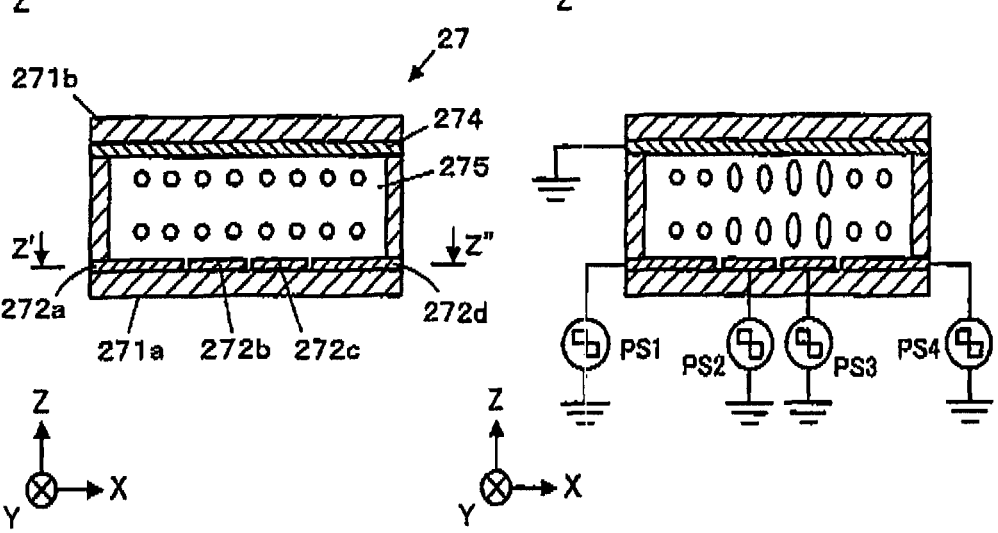
Figure 4C:
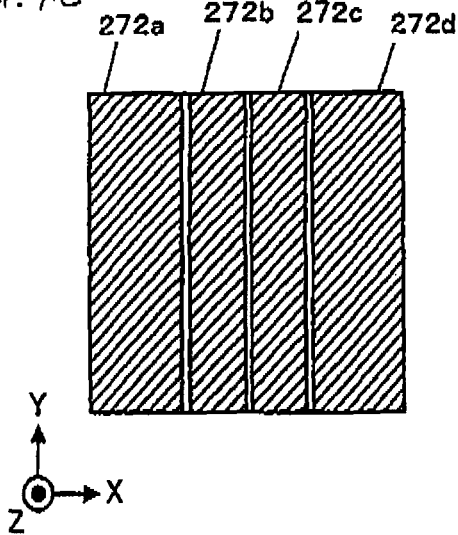

The rectangular wave ac power sources PS1, PS2, PS3 and PS4 are respectively connected to the low resistance electrodes 272a, 272b, 272c and 272d to apply respectively different voltages to the low resistance electrodes 272a, 272b, 272c and 272d (FIG. 4B). For instance, the voltage applied to the low resistance electrode 272a is designed to be the lowest and the voltages to be applied to the low resistance electrodes 272d, 272b and 272c are designed to be gradually higher in order of the electrodes.

As mentioned in the above-described example, when the voltages that are higher in order of the low resistance electrodes 272a, 272d, 272b and 272c are applied to the electrodes, the azimuth directions $A_d$ of slow axes of liquid crystal molecules in the birefringent material layer 275 show the same directions in the surfaces of the substrates (in an X-Y plane), however, inclinations θ in the directions of major axes of the liquid crystal molecules with respect to the direction of an optical axis (a direction of a Z axis) are smaller in order of the low resistance electrodes 272a, 272d, 272b and 272c. Especially, in the third embodiment, the four exemplified electrodes substantially cover a surface that comes into contact with the liquid crystal. Retardation values R of the birefringent material layer 275 in the direction of the z axis are substantially constant for each of areas corresponding to the low resistance electrodes 272a, 272b, 272c and 272d and the retardation values R in the substrate surfaces of the birefringent material layer 275 are discontinuously distributed between the areas corresponding to the low resistance electrodes 272a, 272b, 272c and 272d.

The number of the low resistance electrodes is not limited to four and the number of electrodes to which different voltages are applied may be provided. Electrode of arbitrary areas and shapes may be provided in the X-Y plane. Further, the structures of the first embodiment to the third embodiment exemplified in the type of the form 1 may be combined together. The low resistance electrodes may be provided not only on the upper surface of the one transparent substrate, but also on both the opposed substrate surfaces to distribute voltages.

Fourth Embodiment

A phase modulating element according to a fourth embodiment of the present invention is a phase modulating element of a type of the form 1 and includes a first transparent substrate and a second transparent substrate that are arranged to be opposed to each other and a birefringent material layer composed of a polymer liquid crystal and sandwiched between the first transparent substrate and the second transparent substrate. An alignment process similar to that of the phase modulating element 25 of the first embodiment is carried out, however, electrodes are not formed on the first transparent substrate and the second transparent substrate.

The thickness of the birefringent material layer is worked by a photolithography or etching process so that the desired distribution of retardation values R can be realized.

Fifth Embodiment

A phase modulating element 35 according to a fifth embodiment of the present invention is a phase modulating element of a type of the form 2 and includes a birefringent material layer 355 in which azimuth directions $A_d$ of slow axes are continuously distributed in a plane (an X-Y plane) orthogonal to an optical axis.

The directions of thick lines represent the azimuth directions $A_d$ of the slow axes in the birefringent material layer 355 respectively, and the lengths of the thick lines represent the levels of retardation values R of the birefringent material layer 355.

Figure 5A:
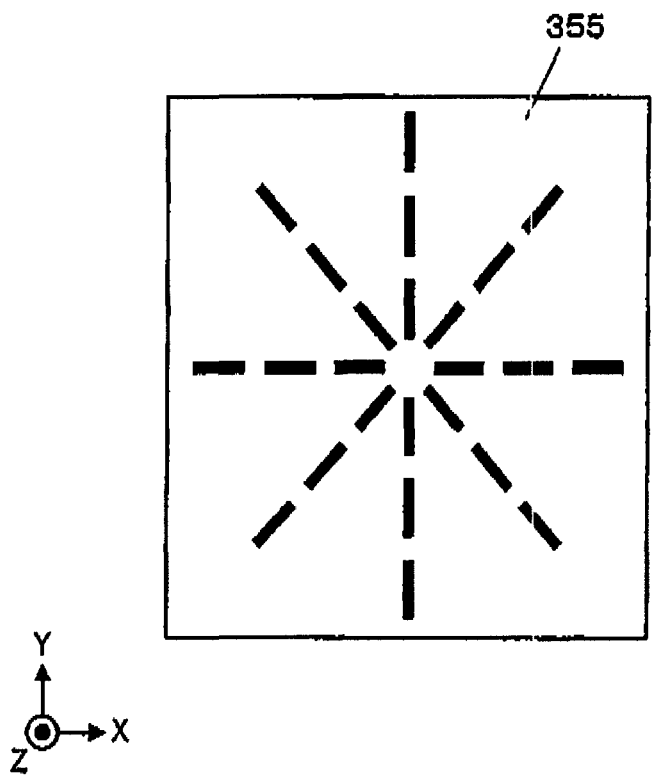
FIGS. 5A and 5B are X-Y plan views of a phase modulating element according to a fifth embodiment of the present invention.
Figure 5B:
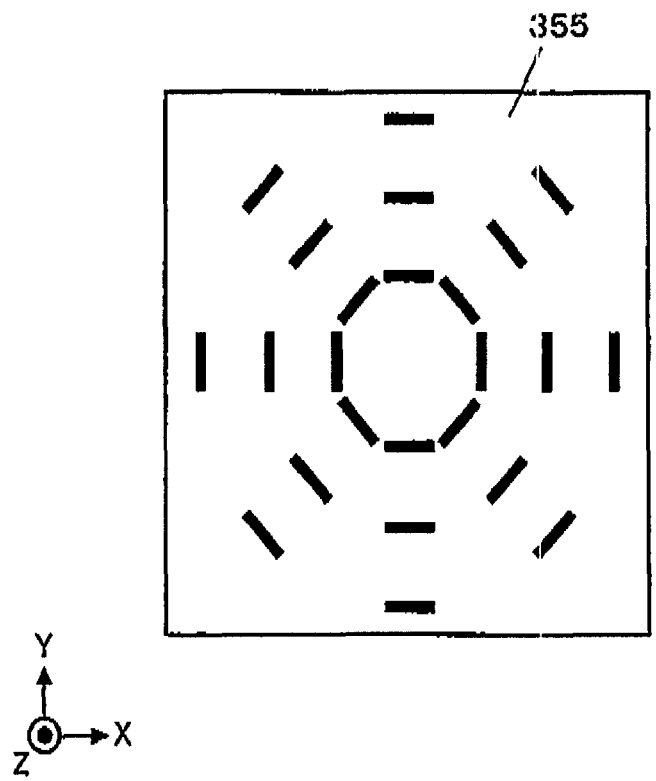

Namely, FIG. 5A shows the birefringent material layer 355 in which the azimuth directions $A_d$ of the slow axes are pointed to radial directions of a concentric circle having the optical axis as a center. FIG. 5B shows a birefringent material layer 355 in which the azimuth directions $A_d$ of the slow axes are pointed to circumference directions of a concentric circle having the optical axis as a center. As the birefringent material layer 355, a liquid crystal or a polymer liquid crystal can be used.

In the phase modulating element 35 shown in FIGS. 5A and 5B, after an alignment process is applied to surfaces opposed to a first transparent substrate 351a and a second transparent substrate 351b so that liquid crystal molecules are aligned to the radial directions of the concentric circle having the optical axis as the center and the circumference directions of the concentric circle having the optical axis as the center, the liquid crystal may be injected between the first transparent substrate 351a and the second transparent substrate 351b.

As the alignment process, an alignment film such as a polyimide film is rubbed. It is applicable to form grooves extended in directions to which the grooves are desired to be aligned. Otherwise, many micro grooves may be provided on the surfaces of the first transparent substrate 351a and the second transparent substrate 351b that come into contact with the liquid crystal layer so that liquid crystal molecules follow the grooves.

Further, at this time, when the retardation value R is odd number times as large as λ/2 (λ designates the wavelength of an incident light), an effect of canceling polarization is preferably high and an effect of reducing speckle noise is desirably high. Further, since the phase modulating element 35 can cancel the polarization without depending on the polarizing direction of the incident light, a degree of freedom in arrangement is preferably increased.

When lights having a plurality of wavelengths pass through the phase modulating element 35, if the birefringent material layer is used in which as the wavelength of the incident light is longer, the retardation value R is the more increased, the effect of canceling the polarization is preferably obtained in a wide wavelength range.

At this time, the retardation values R relative to the lights of the wavelengths may be respectively adjusted so that the retardation value R in each wavelength is odd number times as large as λ/2.

When a laser light source is used that oscillates the lights having the wavelengths of, for instance, 465 nm, 532 nm and 650 nm, the phase modulating elements 35 having the retardation values R ½ times as large as the wavelengths can be respectively installed in optical paths through which the lights of the wavelengths respectively individually pass.

Otherwise, one phase modulating element 35 may be installed in an optical path through which the lights of the three wavelengths 465 nm, 532 nm and 650 nm commonly pass. Thus, the number of the phase modulating elements 35 can be reduced.

In this case, when differences between extraordinary refractive indexes and ordinary refractive indexes in the wavelengths of the employed birefringent material layer 355 respectively are 0.164, 0.153 and 0.146, for instance, the thickness of the birefringent material layer 355 is set to 15.6 μm. Thus, the retardation values R relative to the lights of the wavelengths can respectively preferably reach 5.5λ, 4.5λ and 3.5λ, which are the retardation values odd number times as large as ½ in the wavelengths, respectively.

As described above, the azimuth directions $A_d$ of the slow axes are distributed in the plane orthogonal to the optical axis, so that a polarized state can be spatially changed in the sectional direction of the lights passing through the phase modulating element, and a coherent property is decreased so that the speckle noise can be reduced.

Sixth Embodiment

Figure 6A:
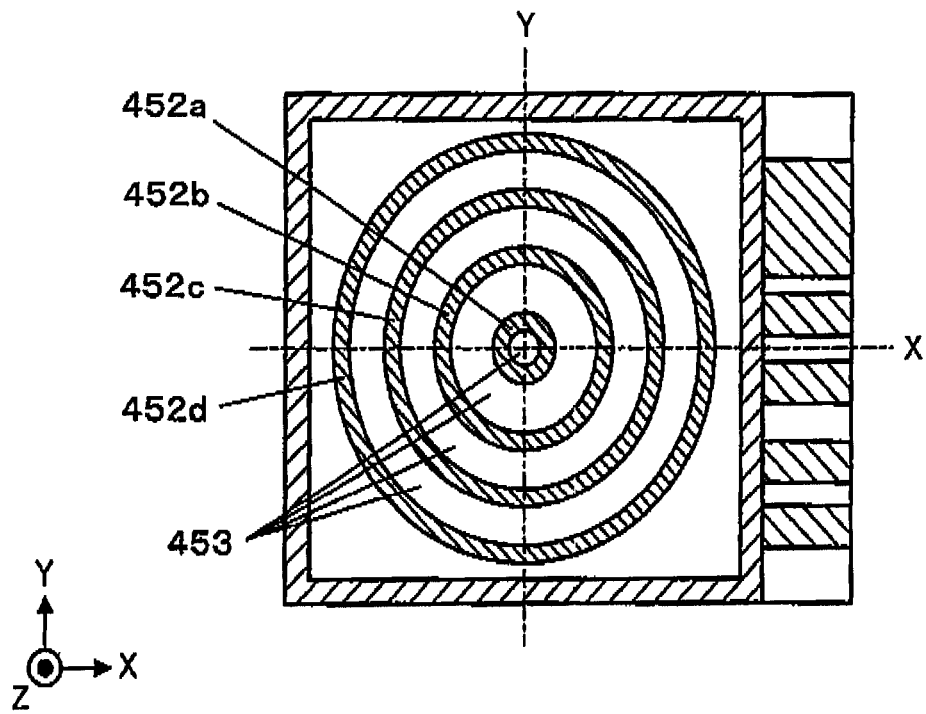
FIGS. 6A and 6B are explanatory views of a phase modulating element according to a sixth embodiment of the present invention.

A phase modulating element 45 according to a sixth embodiment of the present invention is a phase modulating element of a type of the form 3 and can externally apply a voltage to concentric low resistance electrodes 452a, 452b, 452c and 452d and high resistance electrodes 453 as shown in FIG. 6A in place of the low resistance electrodes 252a and 252b and the high resistance electrode 253 formed on the first transparent substrate 251a of the first embodiment, so that retardation values R of a birefringent material layer can be controlled in accordance with an applied voltage.

Figure 7A:
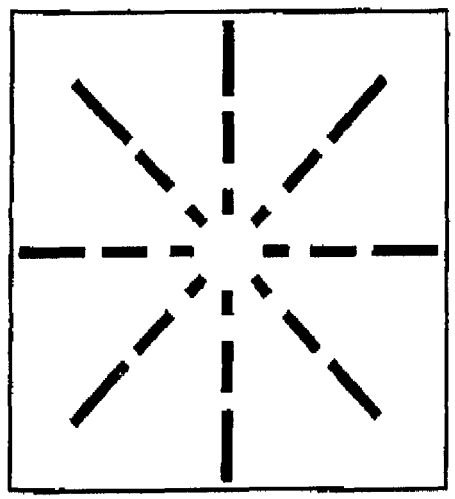
FIGS. 7A to 7D are explanatory views showing the distribution of a retardation value R and an azimuth direction $A_d$ of a slow axis at the time of applying a voltage in the phase modulating element shown in FIGS. 6A and 6B.
Figure 7B:
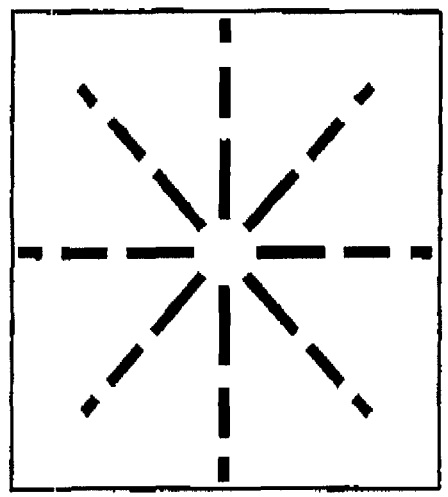

The phase modulating element 45 can realize the distributions of retardation values R and azimuth directions $A_d$ of slow axes as shown in FIG. 5A and FIGS. 7A and 7B.

For instance, when a liquid crystal whose dielectric anisotropy is negative is aligned to the direction of an optical axis (a Z axis) at the time of applying no voltage, if a gradient electric field that is larger stepwise in the radial direction from the center of the optical axis is applied, the retardation values R are distributed as shown in FIG. 7A. Further, when the direction of the gradient of the gradient electric field is changed, a state as shown in FIG. 7B can be formed.

On the other hand, when a liquid crystal whose dielectric anisotropy is positive is aligned in horizontal and radial directions with the optical axis set to a center in an X-Y plane orthogonal of the optical axis (the Z axis) at the time of applying no voltage, the gradient electric field is similarly applied so that states as shown in FIG. 5A and FIGS. 7A and 7B can be formed.

As described above, the high resistance electrodes are combined with the low resistance electrodes to form the gradient electric field so that the distribution including continuing retardation values R can be formed. Further, divided electrodes may be used to apply prescribed voltages respectively to the electrodes so that the similar distribution of retardation values R can be formed.

Figure 7C:
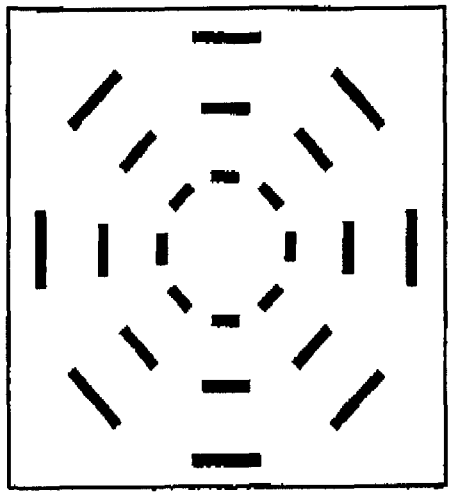
Figure 7D:
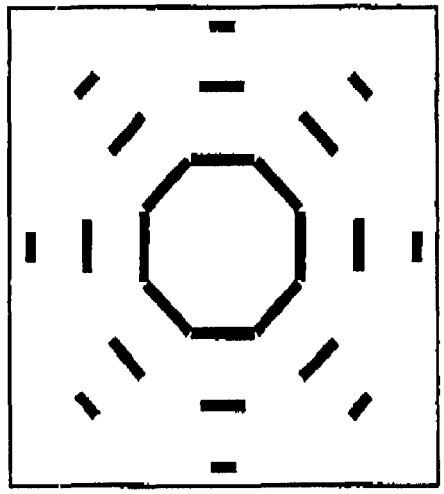
Figure 7D:
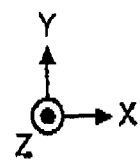
Figure 8:
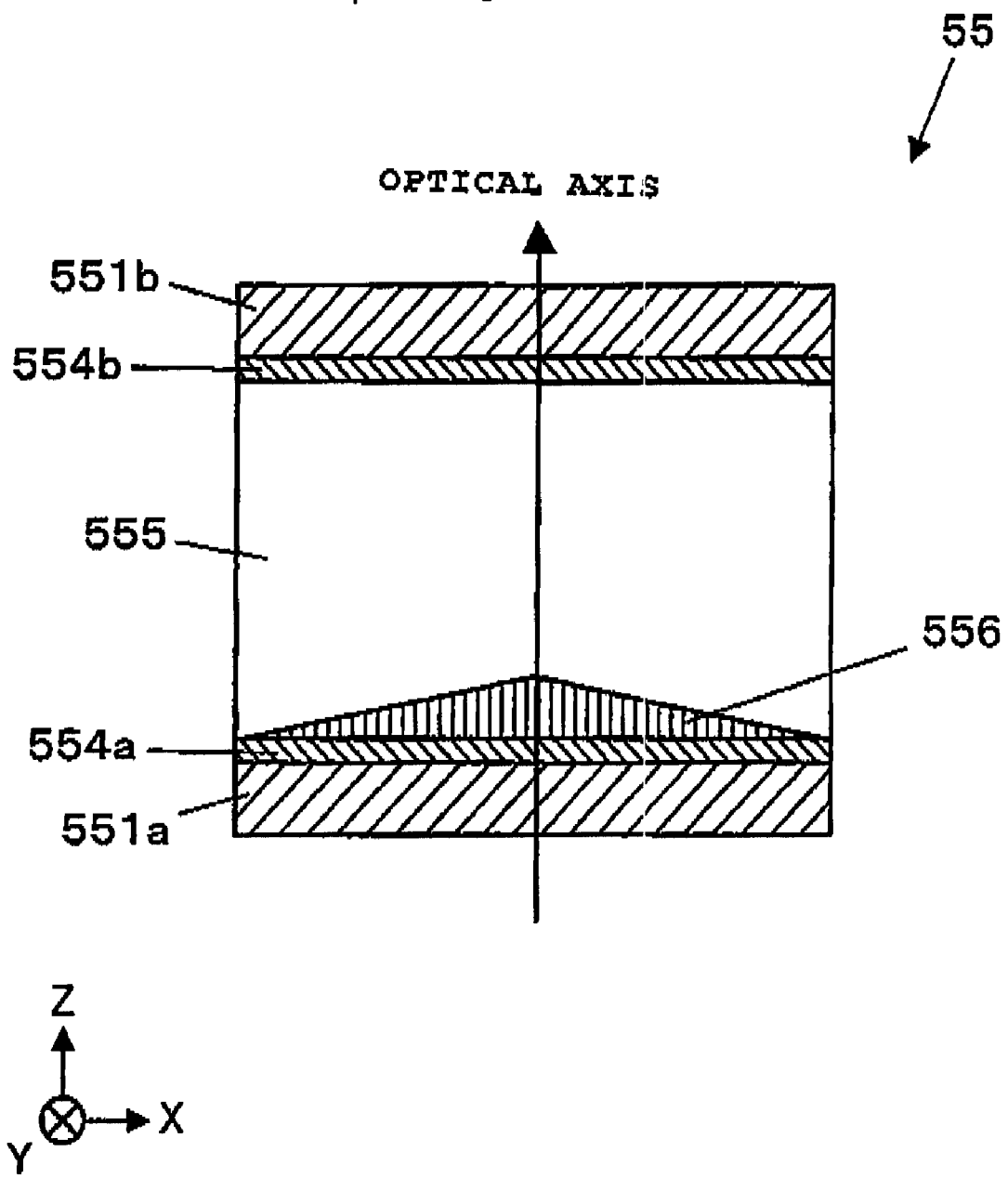
FIG. 8 is a sectional view showing a modified example of the phase modulating element of FIGS. 6A and 6B.

As a method for applying the above-described gradient electric field, as shown in FIG. 8, a phase modulating element 55 may be used that includes a dielectric member 556 provided on at least one transparent electrode 554a and having a thickness changed in the radial direction of a concentric circle having an optical axis as a center. When a voltage is applied to the phase modulating element 55, the gradient electric field corresponding to the thickness of the dielectric member is applied to a birefringent material layer 555. When an alignment process is carried out in the radial direction of the concentric circle having the optical axis as the center, the alignment states of liquid crystal molecules similar to those of FIGS. 7A and 7B can be formed. When the alignment process is carried out in the circumference direction of the concentric circle having the optical axis as the center, the alignment states of the liquid crystal molecules similar to those of FIGS. 7C and 7D can be formed.

In this example, the thickness of the dielectric member 556 is changed, however, the thickness may be equalized and the distribution of dielectric constants may be formed to obtain the same effects. Further, the gradient electric field may be generated by cooperation with the changing of the dielectric constants and the changing of the thickness. In such a way, the number of terminals for applying the voltage can be reduced.

Further, a polymer liquid crystal may be used in place of the liquid crystal to manufacture a birefringent material layer and the thickness of the birefringent material layer may be worked by a photolithography and an etching process to realize a desired distribution of retardation values R.

Seventh Embodiment

Figure 9:
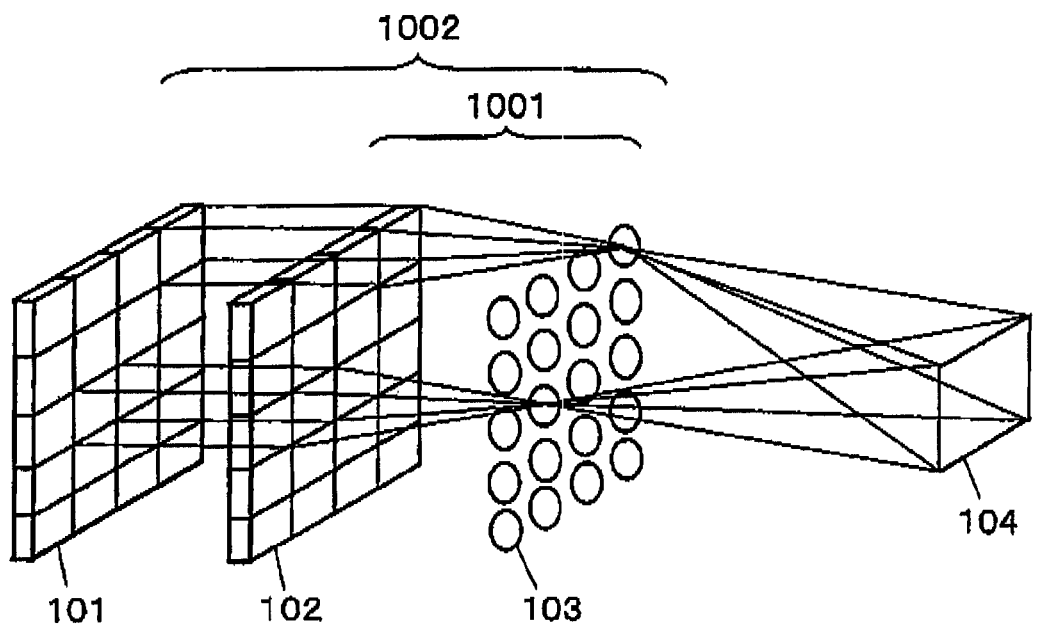
FIG. 9 is a block diagram of an optical phase modulator according to a seventh embodiment of the present invention.

As shown in FIG. 9, an optical phase modulator 1002 according to a seventh embodiment of the present invention has an array structure in a plane orthogonal to the optical axis of an incident light and includes an array shaped phase modulating part 101 that modulates the phases of the incident lights in elements (designated by array elements, hereinafter) of the array structure respectively and an optical shaping part 1001 that divides the incident lights into a plurality of light fluxes respectively corresponding to the array elements, and then, superposes the plurality of the light fluxes on one.

Then, the array shaped phase modulating part 101 includes a birefringent medium in which at least one of a retardation value R and an azimuth direction of a slow axis in a plane orthogonal to the optical axis of the incident light varies.

Here, the optical shaping part 1001 includes a first lens array 102 and a second lens array 103 having lens functions for each of spatially divided elements (designated by lens elements, hereinafter) corresponding to the array elements of the array shaped phase modulating part 101.

The lens elements of the first lens array 102 respectively have rectangular shapes similar to the rectangular shape of a lighting area 104 and the array elements of the array shaped phase modulating part 101 respectively have likewise similar rectangular shapes. Transmitted lights are phase modulated respectively for array element areas by the array shaped phase modulating part 101, and then, incident on the first lens array 102.

The lights are superposed on the lighting area by the first lens array 102 and the second lens array 103 to form an image. At this time, since the phases of the superposed lights are respectively modulated by the array shaped phase modulating part 101, the phases are multiplexed and the lights whose phases are different are mutually superposed. When the wavelength of the incident light is supposed to be λ, a level of phase modulation is preferably λ/2 or larger and more preferably λ or larger.

In this embodiment, since the lights are spatially divided and phase modulated in the shapes corresponding to the array element areas, an influence of diffraction can be suppressed in dividing boundary parts. Further, when the intensities of the incident lights are distributed in the plane orthogonal to the optical axis, since the optical shaping part 1001 also serves to equalize a quantity of light, the phases can be multiplexed and the quantity of light can be equalized at the same time.

Figure 10:
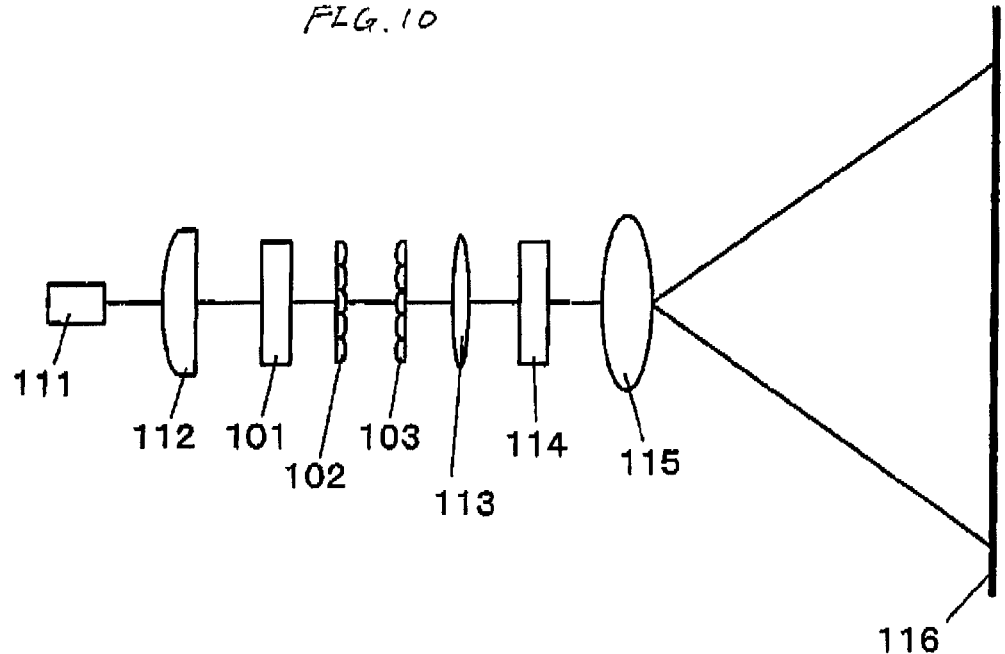
FIG. 10 is a schematic diagram showing an optical system of the projection type display device on which the optical phase modulator of the present invention is mounted.
Figure 11:
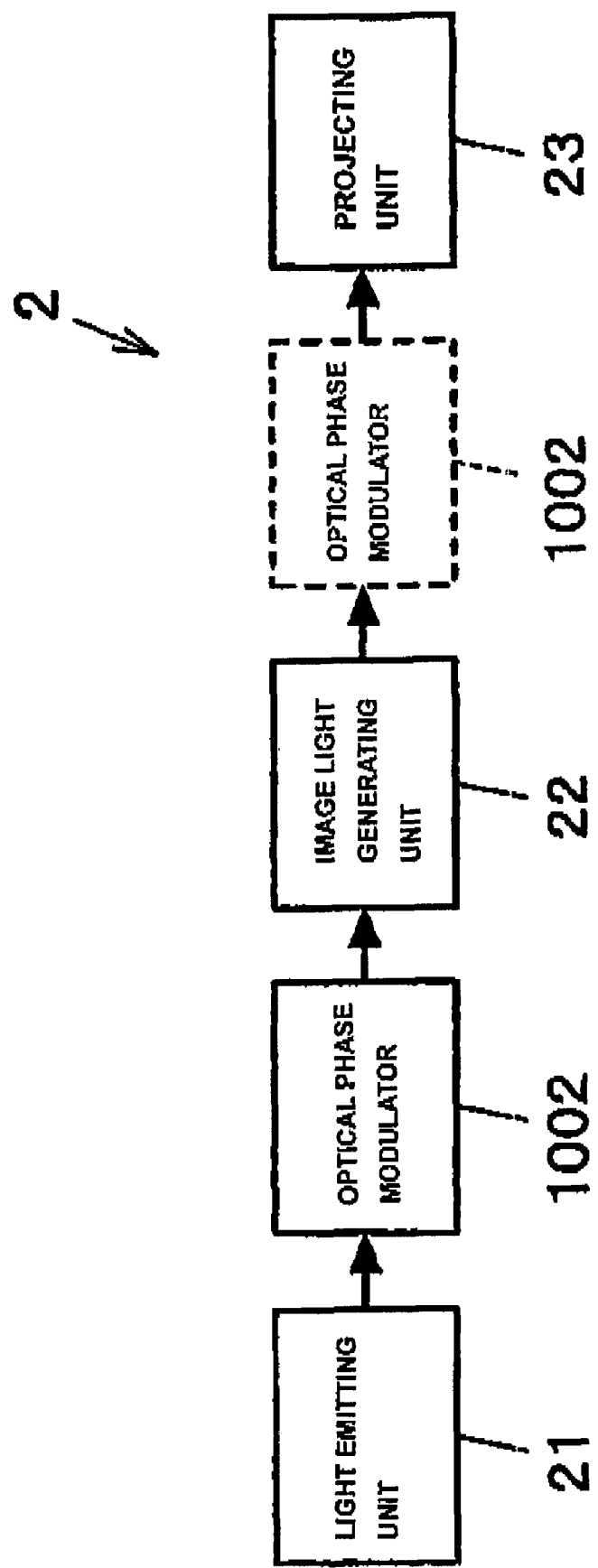
FIG. 11 is a block diagram of the projection type display device.

FIG. 10 and FIG. 11 show one example that the optical phase modulator 1002 is mounted on the projection type display device.

Namely, a projection type display device 2 according to the present invention includes a light emitting unit 21 having at least one light source for emitting a coherent light, an image light generating unit 22 that modulates the light emitted by the light emitting unit 21 to generate an image light and a projecting unit 23 that projects the image light. Then, between the light emitting unit 21 and the image light generating unit 22, or between the image light generating unit 22 and the projecting unit 23, the optical phase modulator 1002 is arranged.

The lights having a coherent property that are outputted from a laser light source 111 as the light emitting unit 21 are collimated by a lens 112, are incident on the optical phase modulator 1002 including the array shaped phase modulating part 101, the first lens array 102 and the second lens array 103, passes through a lens 113 and an image forming part 114 as the image light generating unit 22, and then, are projected on a screen by a projection lens 115 as the projecting unit 23. As the image forming part 114, typically, a transmission type liquid crystal panel can be used. Further, a reflection type liquid crystal panel or a digital micro mirror device (DMD) or the like may be employed.

The lights incident on the optical phase modulator 1002 are phase modulated for each of the array elements, and respectively superposed together and allowed to be illuminated on the image forming part 114. Speckle patterns generated on the screen 116 are different depending on projected images for each of the array elements. Accordingly, the speckle patterns are averaged correspondingly to the number of the array elements to be superposed to observe reduced speckle noise.

Further, the level of the phase modulation is changed in time for each of the array elements, so that the changes of the speckle patterns in time are superposed to observe the speckle noise that is more reduced.

In the above-description, the collimated lights are incident on the array shaped phase modulating part 101. However, since the lights passing through the array elements of the array shaped phase modulating part 101 may be respectively correspondingly transmitted to the lens elements of the first lens array 102 and the second lens array 103, a place where the array shaped phase modulating part 101 is arranged is not limited to a position shown in FIG. 10.

For instance, the array shaped phase modulating part 101 may be arranged in the diverging lights between the laser light source 111 and the lens 112. In this case, the projection type display device including the optical phase modulator 1002 can be preferably made to be compact. Further, the array shaped phase modulating part 101 may be arranged between the first lens array 102 and the second lens array 103 or in an output side of the second lens array 103.

Further, since the array elements are easily positioned and the number of parts is reduced, the array shaped phase modulating part 101 is preferably formed integrally with at least one of the first lens array 102 and the second lens array 103. Further, a device having a deflecting function may be provided in the image forming part 114 to sweep the lights applied to one point on the screen 116 and modulate the quantity of light at the same time and thus form an image.

Now, the structure of the array shaped phase modulating part 101 including the birefringent medium will be described below.

Figure 12:
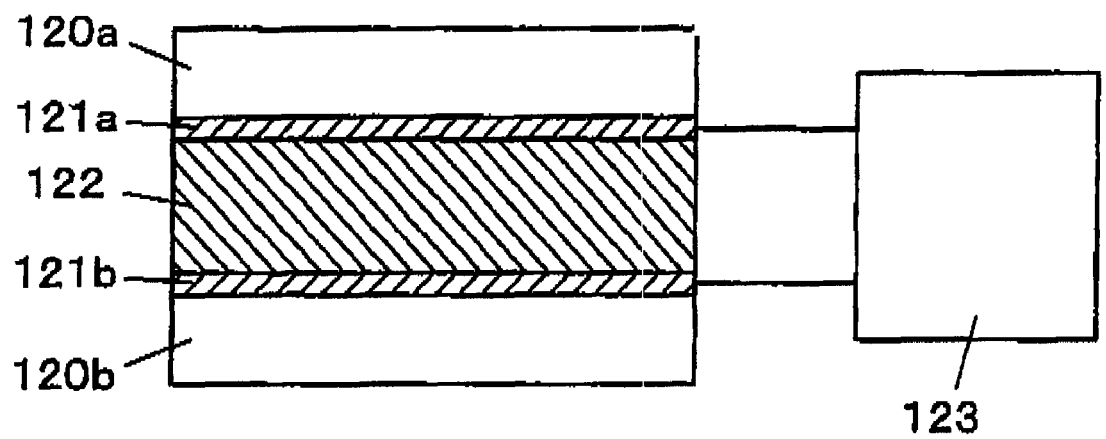
FIG. 12 is an explanatory view of an array shaped phase modulation part including a birefringent medium in the projection type display device.
Figure 12:
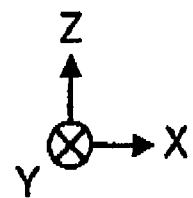

That is, as shown in FIG. 12, the birefringent medium 122 is a liquid crystal layer sandwiched between a pair of transparent substrates 120a and 120b having opposed surfaces on which transparent electrodes 121a and 121b are formed, and retardation values R can be changed in time by a voltage applied to a part between the transparent electrodes 121a and 121b. To the transparent electrodes 121a and 121b, the voltage can be applied from a voltage generator 123.

As a material of the transparent substrates 120a and 120b, glass or plastics such as polyethylene terephthalate (PET), polycarbonate (PC), etc. can be preferably employed. As the transparent electrodes 121a and 121b, ITO, $SnO_2$ or the like can be preferably used.

When a liquid crystal is used as a material of the birefringent medium 122, since a great phase modulation can be achieved under a low voltage, the liquid crystal is very preferable. As the liquid crystal, a nematic liquid crystal is preferable. An alignment film obtained by applying an alignment process such as rubbing to a polyimide film may be provided in the interface between the liquid crystal and the transparent electrode 121a and the interface between the liquid crystal and the transparent electrode 121b. By the alignment process, a vertical alignment, a homogeneous alignment and a hybrid alignment may be given to the transparent substrates 120a and 102b.

When the image forming part 114 of the applied projection type display device 2 is formed with the DMD or the like and the polarized state of the incident lights is not limited to a linear polarization, if the array shaped phase modulating part 101 is allowed to change not only the phase, but also a polarization, the speckle patterns to be superimposed are more increased. Thus, an effect of reducing the speckle noise is increased.

In this case, a twisted alignment may be applied to the liquid crystal used as the birefringent medium 122 of the array shaped phase modulating part 101, or a homogeneous alignment may be applied to the liquid crystal in the projection type display device 2 to form an angle that is not parallel nor orthogonal between the azimuth direction thereof and the polarizing direction of the incident light.

Figure 13:
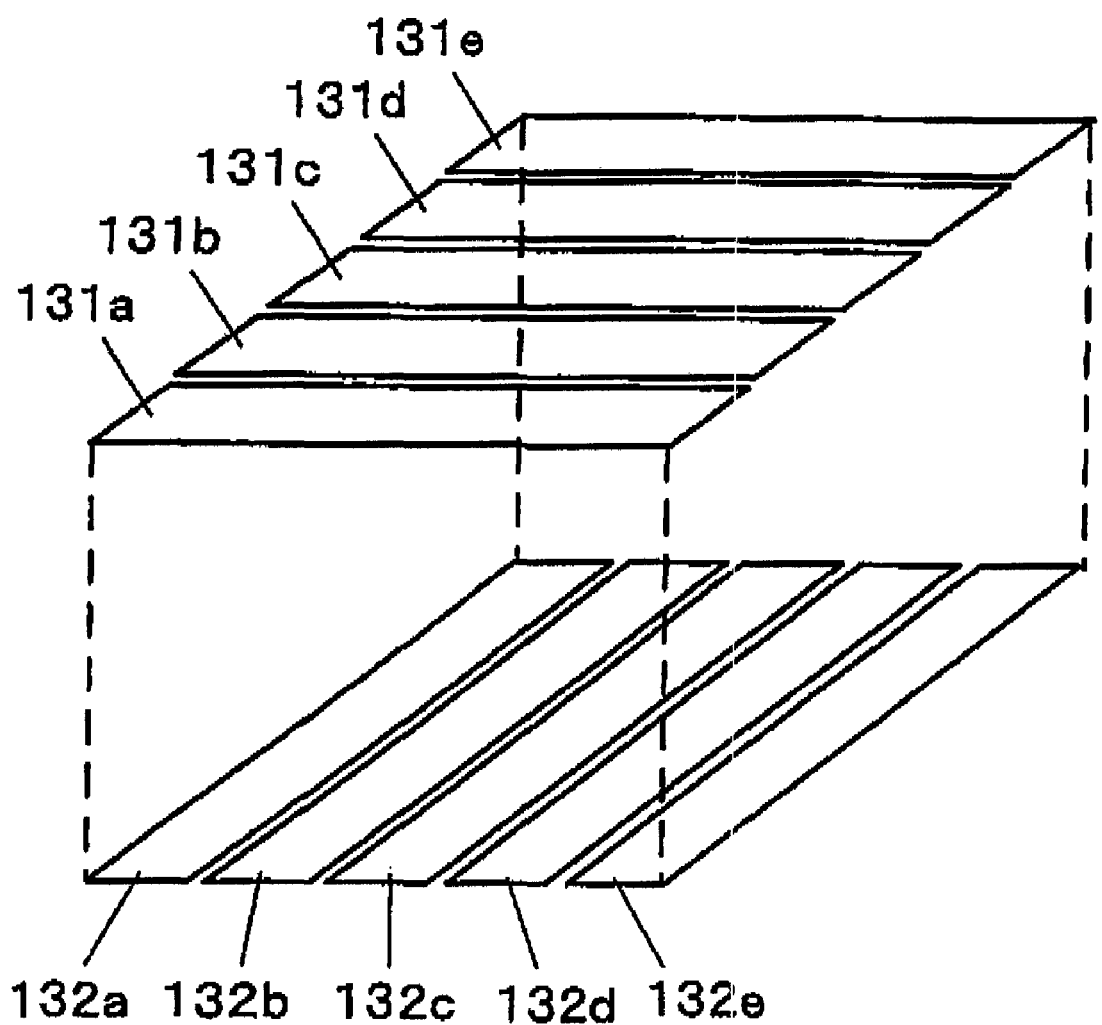
FIG. 13 is a perspective view showing one example of an opposed electrode pattern in the array shaped phase modulation part.

In order to change the phases for each of the array elements, the transparent electrodes 121a and 121b are preferably patterned to prescribed shapes. FIG. 13 shows one example of an opposed electrode pattern. In FIG. 13, different voltages are respectively applied to electrodes 131a to 131e, and 132a to 132e, so that the alignment of the liquid crystal can be changed and the phases can be modulated for each of the array elements.

Figure 14:
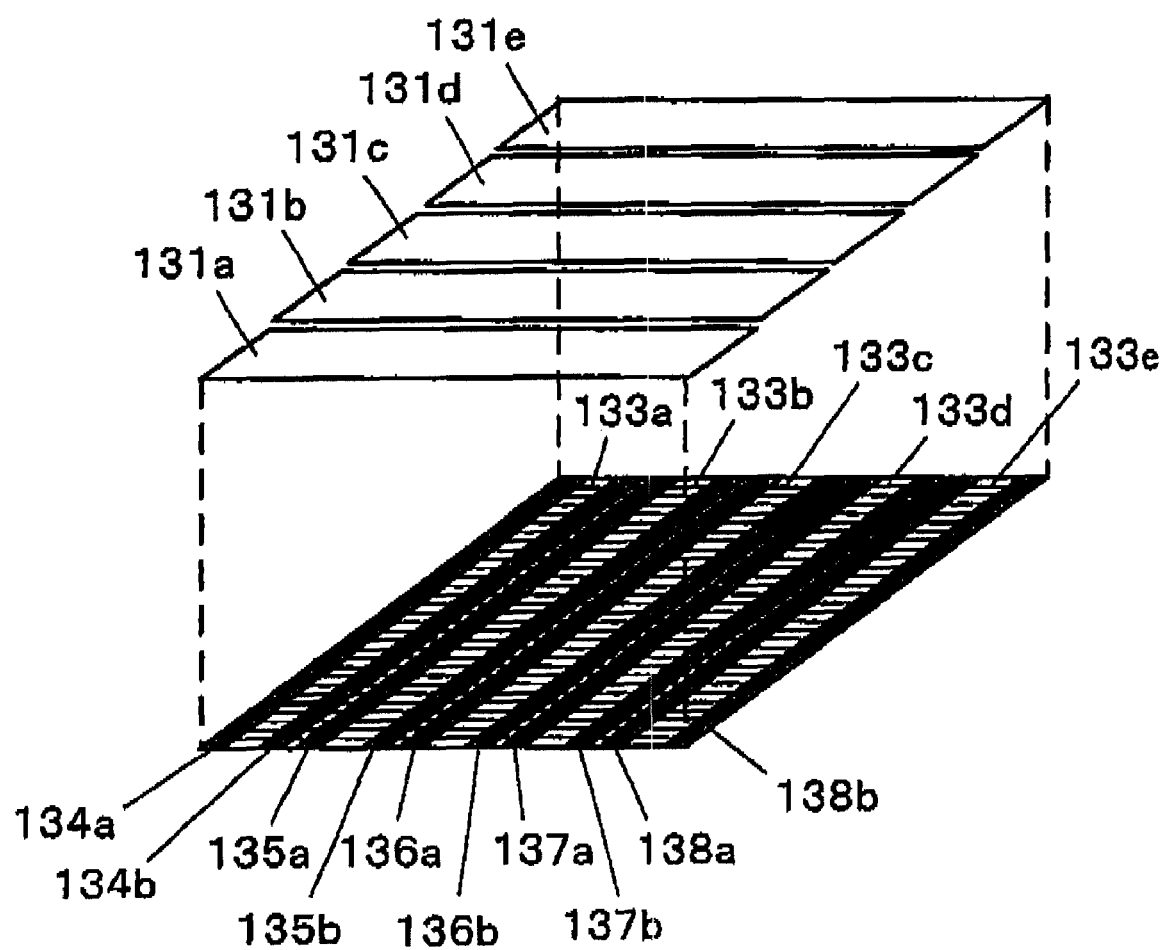
FIG. 14 is a perspective view showing another example of an opposed electrode pattern in the array shaped phase modulation part.

Further, as shown in FIG. 14, one transparent electrode may be formed as a complex electrode including high resistance electrodes 133a to 133e and low resistance electrodes 134a, 134b, 135a, 135b, 136a, 136b, 137a, 137b, 138a and 138b that are arranged at both ends thereof to form a gradient electric field and generate the distribution of retardation values R in each of the array elements. Especially, the voltage is applied so that gradient directions are different for each of the array elements, and when applied voltage is changed in time, the variation of the speckle patterns is preferably increased in time. Further, opposed electrodes 131a to 131e of FIG. 14 are more preferably formed as a complex electrode to distribute the retardation values R two dimensionally for each of the array elements and vary the distribution of the retardation values R in time.

In setting the gradient electric field in this case, a non-linear retardation area of the liquid crystal to the applied voltage may be used. In such a way, the variation of the speckle pattern in time can be preferably increased.

Since the high resistance electrodes transmit the lights, the high resistance electrodes are preferably transparent. For instance, ITO, $SnO_2$, ZnO or the like can be used. Further, the low resistance electrodes may have resistance values lower than those of the high resistance electrodes and metals such as Cr, Cu, Ni, Au, etc. can be used, however, as long as the resistance values are lower than those of the high resistance electrodes, metal oxides such as ITO, $SnO_2$, Zn, etc. may be employed.

A ratio $R_L/R_H$ of the sheet resistance $R_L$ of the low resistance electrodes and the sheet resistance $R_H$ of the high resistance electrodes is preferably 1/1000 or lower. When $R_L/R_H$ exceeds 1/1000, a voltage drop in the low resistance electrodes is increased so that a below-described desired gradient electric field cannot be occasionally obtained. Further, when the sheet resistance $R_H$ of the high resistance electrodes is excessively high, the gradient electric field is not generated. Thus, the sheet resistance $R_H$ of the high resistance electrodes is preferably $10^9 \Omega/\square$ or lower. When the sheet resistance $R_L$ of the low resistance electrodes is lowered as much as possible, the tolerance of the sheet resistance of the high resistance electrodes is more widened. Thus, by considering the easiness of a formation of the transparent electrodes or a cost in addition thereto, the sheet resistance $R_L$ of the low resistance electrodes is preferably located within a range of 1 to $50\Omega/\square$. As the low resistance electrodes, an ITO film having the sheet resistance of $40\Omega/\square$ is preferably exemplified. As the high resistance electrodes, an $SnO_2$ film having the sheet resistance of $100M\Omega/\square$ is preferably exemplified, respectively.

In the above description, the high resistance electrodes are combined with the low resistance electrodes to form the gradient electric field and generate the distribution of the continuous retardation values R, however, the electrodes may be finely divided and prescribed voltages may be applied respectively to the electrodes to form a similar distribution of the retardation values R.

In this embodiment, when a dielectric member (not shown in the drawing) whose thickness is changed in the radial direction of a concentric circle having an optical axis as a center is provided on at least one transparent electrode, not only the dielectric constant of the dielectric member is fixed, and the thickness of the dielectric member is changed to form the gradient electric field, but also the dielectric constant is distributed to equalize the thickness, the same effects can be realized. Further, the change of the dielectric constant may be combined with the change of the thickness to form the gradient electric field. Further, in this embodiment, an example is shown that the liquid crystal layer is made of a single layer, however, the liquid crystal layer may be made of multi-layers.

Example 1

The phase modulating element 25 of the type of the form 1 will be described by using FIGS. 2A to 2C.

Initially, as the first transparent substrate 251a and the second transparent substrate 251b, two glass substrates having the thickness of 0.5 mm are prepared.

On the first transparent substrate 251a, a chromium film having the sheet resistance value of $5\Omega/\square$ is formed and patterned and the low resistance electrodes 252a and 252b are formed at both ends of a substrate surface in the direction of an X axis.

Then, on the first transparent substrate 251a, an $SnO_2$ film having the sheet resistance value of $100 k\Omega/\square$ is laminated and formed as the high resistance electrode 253. The high resistance electrode 253 is electrically connected to the low resistance electrodes 252a and 252b.

On the second transparent substrate 251b, an ITO film of the sheet resistance value of $300\Omega/\square$ is formed to form the opposed electrode 254. The low resistance electrodes 252a and 252b and the opposed electrode 254 include taking out electrode parts (not shown in the drawing) so that a voltage can be externally applied.

On the low resistance electrodes 252a and 252b, the high resistance electrode 253 and the opposed electrode 254 formed on the first transparent substrate 251a and the second transparent substrate 251b, insulating films having the thickness of 40 nm and including $SiO_2$ as a main component are formed, further, alignment films composed of polyimide and having the thickness of 40 nm are formed and a rubbing process is carried out in the direction of a Y axis in the substrate surface.

Then, the first transparent substrate 251a and the second transparent substrate 251b are superposed on each other by opposing to each other the surfaces on which the low resistance electrodes 252a and 252b, the high resistance electrode 253, the opposed electrode 254 and the alignment films are formed, and an outer periphery is sealed by a seal material in which a spacer is mixed to obtain an empty cell having a cell gap of 14 μm.

The above-described low resistance electrodes 252a and 252b, the high resistance electrode 253 and the opposed electrode 254 may be formed by trimming peripheral parts of the substrates or the seal member as required.

Subsequently, a nematic liquid crystal in which the difference Δn between an extraordinary refractive index and an ordinary refractive index is 0.26 and whose dielectric anisotropy is positive is injected from an injection port provided in the seal material and the injection port is sealed to obtain a liquid crystal cell having the birefringent material layer 255.

The opposed electrode 254 is grounded and an external power source that generates a rectangular ac wave having frequency of 1 kHz is connected between the low resistance electrodes 252a and 252b.

When 1.6 Vrms was applied to the low resistance electrode 252a and 0.8 Vrms was applied to the low resistance electrode 252b (voltage difference of 0.8 Vrms), a difference of the retardation value R between a right end and a left end was about 650 nm. When 2.2 Vrms was applied to the low resistance electrode 252a and 0.8 Vrms was applied to the low resistance value 252b (voltage difference of 1.4 Vrms), the difference of the retardation value R was about 1300 nm. At this time, the distribution of the retardation values R as shown in FIG. 2B is obtained.

When a laser beam that oscillates the lights having the wavelength of 650 nm was made to be incident on the phase modulating element 25 in such a way that the polarizing direction of a linear polarization was aligned to the direction of 45° with respect to the Y direction (an alignment direction of the liquid crystal) of the phase modulating element 25 and a degree of polarization of transmitted lights outputted from the phase modulating element 25 was measured, the degree of polarization was about 13% at the time of the voltage difference of 0.8 Vrms, and the degree of polarization was 5% at the time of the voltage difference of 1.4 Vrms, and it was recognized that the polarization was cancelled. The degree of polarization was obtained by measuring stokes vector by a polarimeter.

When the phase modulating element obtained in such a way is inserted into the projection type display device to cancel the polarization, the speckle noise can be reduced and a projection display can be realized.

Example 2

The phase modulating element 45 of the type of the form 3 will be described by using FIGS. 6A and 6B.

Initially, as a first transparent substrate 451a and a second transparent substrate 451b, two glass substrates having the thickness of 0.5 mm are prepared.

On the first transparent substrate 451a, an ITO film having the sheet resistance value of 40Ω/□ is formed and patterned to form the low resistance electrodes 452a to 452d to which a voltage can be externally applied. Then, on the same surface of the transparent substrate 451a, an SnO$_2$ film having the sheet resistance value of 100MΩ/□ is formed and patterned to obtain the high resistance electrodes 453.

On the second transparent substrate 451b, an ITO film of the sheet resistance value of 300Ω/□ is formed to form an opposed electrode 454. On the low resistance electrodes 452a to 452d, the high resistance electrodes 453 and the opposed electrode 454, insulating films having the thickness of 40 nm and including SiO$_2$ as a main component are formed, and further, polyimide films having the thickness of 40 nm are formed as vertical alignment films.

Then, the first transparent substrate 451a and the second transparent substrate 451b are superposed on each other by opposing to each other the surfaces on which the electrodes and the alignment films are formed so as to have a cell gap of 10 μm, and an outer periphery is sealed by a seal material (not shown in the drawing) to obtain an empty cell. A nematic liquid crystal having Δn=0.15 and a negative dielectric anisotropy is injected from an injection port provided in the seal material and the injection port is sealed by an acrylic adhesive agent to obtain a liquid crystal cell having a birefringent material layer 455.

Then, voltages are applied to the low resistance electrodes 452a to 452d by using an external power source that generates a rectangular ac wave having frequency of 1 kHz. The voltages applied to the low resistance electrodes 452a to 452d were respectively set to 2.9 Vrms, 3.2 Vrms, 3.5 Vrms and 3.8 Vrms.

Figure 6B:
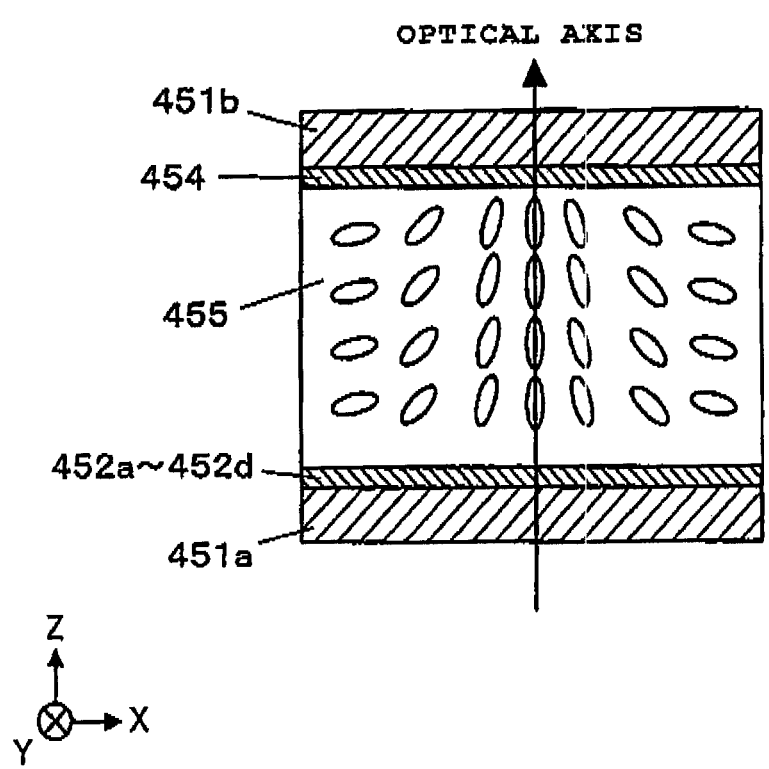

As shown in FIG. 6B and FIG. 7A, it was recognized that the azimuth directions $A_d$ of the slow axes were aligned to the radial directions of the concentric circle having the optical axis as a center, as the slow axes were separated more from the direction of the optical axis (a direction of a Z axis), the inclinations θ of the slow axes with respect to the direction of the optical axis were the larger and the retardation values R were the more increased.

After that, when the voltage of 3.2 Vrms was applied to the low resistance electrodes 452a to 452d, it was recognized that the azimuth directions $A_d$ of the slow axes were aligned to the radial directions of the concentric circle having the optical axis as the center as shown in FIG. 7A, and the retardation values R were equalized.

When a laser beam that oscillates the lights having the wavelength of 650 nm was made to pass through the phase modulating element to measure a degree of polarization, it was recognized that the degree of polarization was 5% at the time of applying the voltage of 3.2 Vrms to the low resistance electrodes 452a to 452d and the polarization was cancelled. At this time, it was recognized that the polarizing directions of the linear polarization of incident laser beams could be likewise cancelled in any of the directions. The degree of polarization was obtained by measuring stokes vector by a polarimeter.

When the phase modulating element obtained in such a way is inserted into the projection type display device to cancel the polarization, the speckle noise can be reduced and a projection display can be realized.

Example 3

Figure 15A:
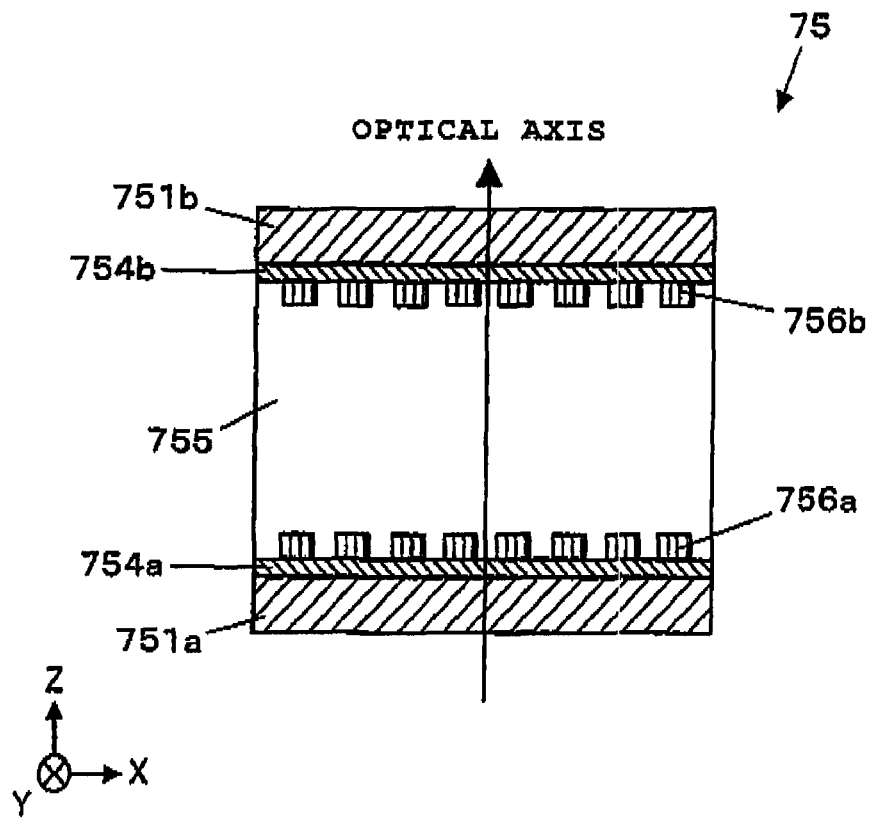
FIGS. 15A and 15B are explanatory views showing an example of the phase modulating element of the sixth embodiment.
Figure 15B:
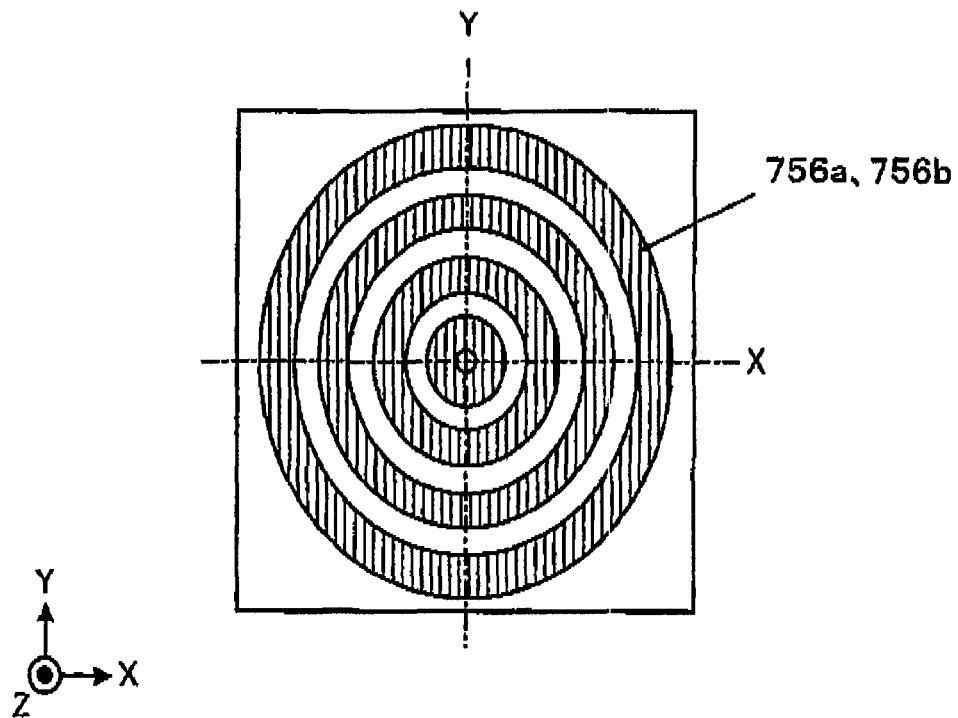

A phase modulating element 75 of the type of the form 3 will be described by using FIGS. 15A and 15B.

Initially, as a first transparent substrate 751a and a second transparent substrate 751b, two glass substrates having the thickness of 0.5 mm are prepared. On the first transparent substrate 751a and the second transparent substrate 751b, ITO films having the sheet resistance value of 300Ω/□ are formed to form opposed transparent electrodes 754a and 754b.

On the transparent electrodes 754a and 754b, SiON (silicon oxynitride) films having the refractive index of 1.54 and the thickness of 0.3 μm are formed to form concentric grooves 756a and 756b having the depth of 0.3 μm and a pitch between the grooves of 5 μm by a photolithography and a dry etching process. On the concentric grooves 756a and 756b, polyimide films having the thickness of 40 nm are formed as alignment films (not shown in the drawing).

Then, the first transparent substrate 751a and the second transparent substrate 751b are superposed on each other by opposing to each other the surfaces on which the transparent electrodes 754a and 754b and the alignment films are formed and an outer periphery is sealed by an epoxy resin having glass fibers mixed to obtain an empty cell having a cell gap of 10 μm.

A nematic liquid crystal having Δn=0.15 and a positive dielectric anisotropy is injected from an injection port provided in a seal material and the injection port is sealed to obtain a liquid crystal cell having a birefringent material layer 755.

Then, lead wires are attached so that a voltage can be applied to the transparent electrodes 754a and 754b from an external part. After that, the liquid crystal cell is heated to 120° C., and then, cooled to stabilize the alignment of the liquid crystal.

When the depth of the concentric grooves is large, since scattered lights of diffracted lights generated by the grooves become stray lights to cause a contrast to be deteriorated, the product Δn.d of a difference Δn between the refractive index of a material for forming the grooves and an ordinary refractive index of the liquid crystal or an extraordinary refractive index of the liquid crystal and the depth d of the grooves is preferably 1/10 as large as the wavelength of a light to be used or lower, and more preferably 1/20 or lower. In order to align liquid crystal molecules, d is preferably 0.05 μm or more.

In the liquid crystal cell obtained in such a way, when an applied voltage is 0 Vrms, the liquid crystal molecules have a radial alignment in which the longitudinal directions of the liquid crystal molecules are aligned to orthogonal directions relative to the grooves.

Figure 16A:
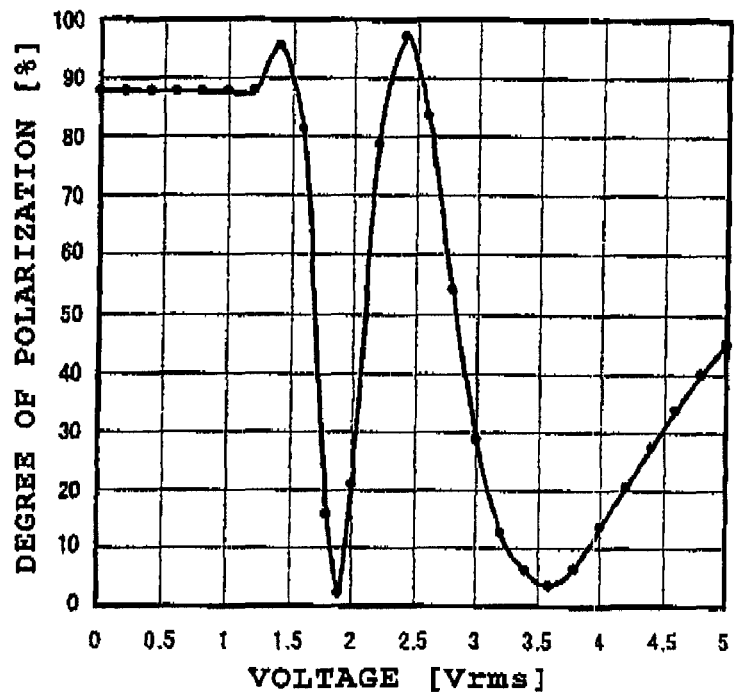
FIGS. 16A and 16B are graphs showing a dependence of a degree of polarization on an applied voltage and a dependence of a degree of polarization on a polarizing direction under the applied voltage of 1.9 Vrms.

When a laser beam of a linear polarization having the wavelength of 632.8 nm and the diameter of a beam of 2 mm was made to pass through the manufactured liquid crystal cell and a voltage was applied thereto by using an external power source that generates a rectangular ac wave having frequency of 1 kHz to measure a degree of polarization, the degree of polarization was 10% or lower at the time of the voltage of 1.9 Vrms and 3.6 Vrms as shown in FIG. 16A and it was recognized that the polarization was cancelled. Under these voltages, retardation values of the liquid crystal were respectively about 3λ/2 and about λ/2.

Figure 16B:
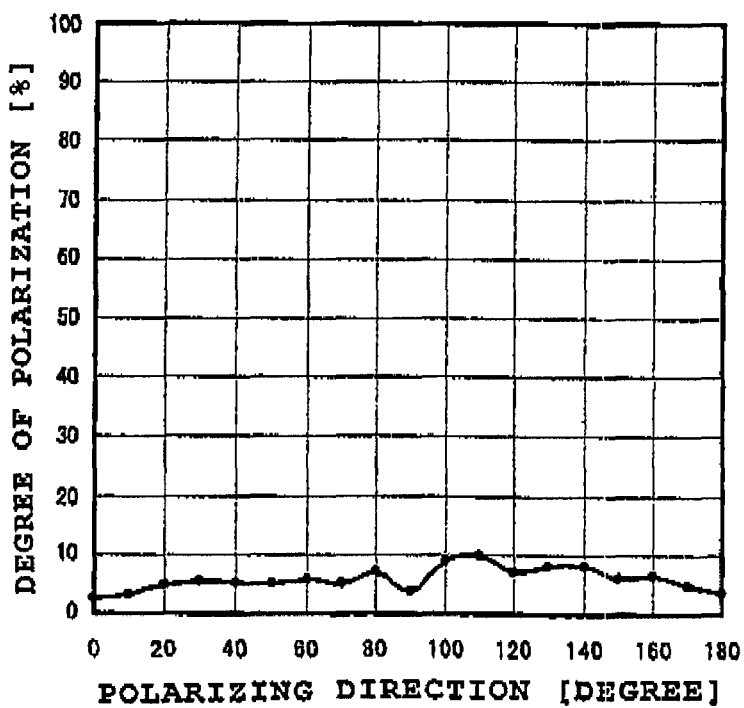
Figure 17:
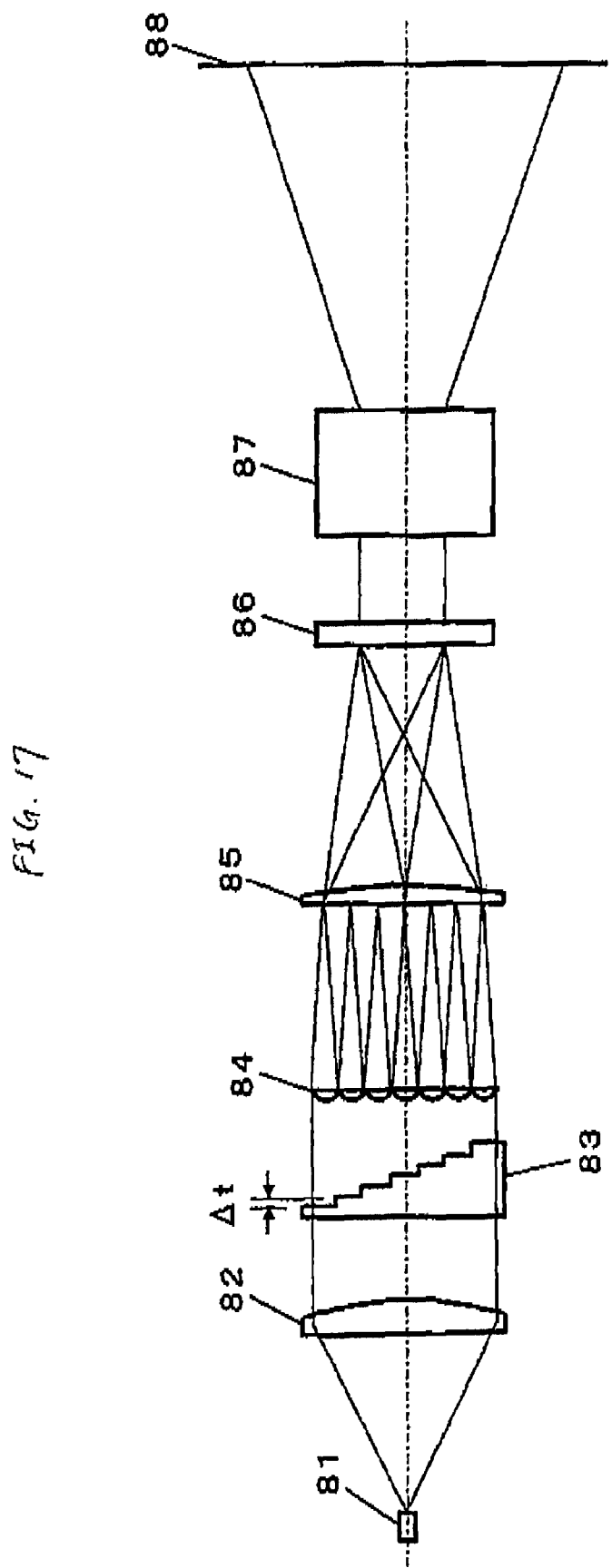
FIG. 17 is a block diagram of a usual image display device.
Figure 18:
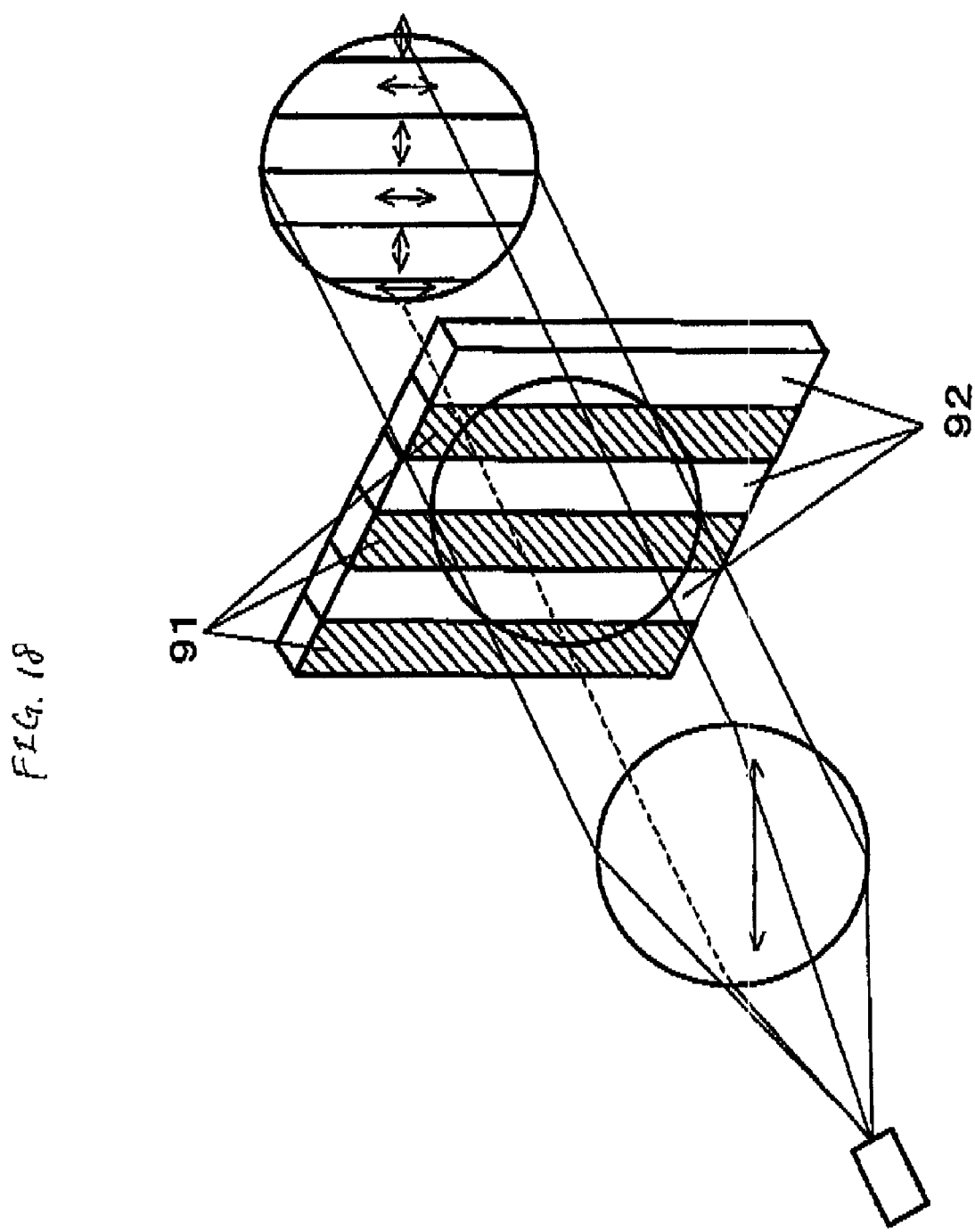
FIG. 18 is a perspective view of a conventional spatial polarization control element.

Further, when the voltage was set to 1.9 Vrms and the polarizing direction of the linear polarization was rotated on an optical axis as a center to measure the degree of polarization, as shown in FIG. 16B, even when the lights of any of polarizing directions were incident, the degree of polarization was 10% or lower and it was recognized that the polarization was cancelled. The degree of polarization was obtained by measuring stokes vector by a polarimeter.

When this phase modulating element is inserted into the projection type display device to cancel the polarization, the speckle noise can be reduced and a projection display can be realized.

In the above-described example, the cross-sectional shapes of the grooves are rectangular, however, when the cross-sectional shape is a blaze type or a multi-step type, the alignment states of the liquid crystal molecules during the application of the voltage can be preferably more stabilized.

Example 4

Initially, the array shaped phase modulating part 101 of this example will be described by referring to FIGS. 12 and 14.

On the first transparent substrate 120a as a glass substrate having the thickness of 0.5 mm, the ITO film having the sheet resistance value of 40Ω/□ is formed and patterned to form the low resistance electrodes 134a, 134b, 135a, 135b, 136a, 136b, 137a, 137b, 138a and 138b. Further, on the transparent substrate 120b as a glass substrate having the thickness of 0.5 mm, the ITO film having the sheet resistance value of 300Ω/□ is formed and patterned to form the opposed electrodes 131a to 131e.

Then, on the same surfaces of the low resistance electrodes of the transparent substrate 120a, an SnO$_2$ film having the sheet resistance value of 100 kΩ/□ is formed and patterned to obtain the high resistance electrodes 133a to 133e. The width of the high resistance electrodes 133a to 133e is set to 3.2 mm and the width of the electrodes 131a to 131e is set to 2.4 mm to obtain an electrode pattern in which 5×5 array elements having 2.4×3.2 mm size are arranged.

On the electrodes respectively, insulating films having the thickness of 40 nm and including SiO$_2$ as a main component are formed, and further, polyimide films having the thickness of 40 nm are formed as vertical alignment films. A rubbing process is carried out in a Y direction. Then, both the transparent substrates are superposed on each other by opposing to each other the alignment films so as to have a cell gap of 3 μm, and an outer periphery is sealed by an epoxy resin. A nematic liquid crystal having Δn=0.26 and a positive dielectric anisotropy is injected from an injection port and the injection port is sealed by an acrylic adhesive agent. To the electrodes, a voltage can be applied from the voltage generator 123.

Further, an example of the projection type display device will be described by using FIG. 10.

The lights outputted from the laser light source 111 are collimated by the lens 112 and projected to the above-described array shaped phase modulating part 101.

The array shaped phase modulating part 101 is divided into 5×5 array elements to modulate the phases of the lights respectively in the array elements and project the lights on the first lens array 102. The first lens array 102 is also formed with the lens elements of the same 2.4 mm×3.2 mm size as that of the array shaped phase modulating part 101. The respectively divided and phase modulated lights are incident on the corresponding lens elements. The lights are projected on the image forming part 114 through the first lens array 102, the second lens array 103 and the lens 113.

At this time, the lights divided into sizes of 2.4×3.4 mm in the array shaped phase modulating part 101 are respectively superposed together to become a size of 13. 5×18 mm and projected on the image forming part 114. Then, the light to which image information is applied by the image forming part 114 is projected on the screen 116 by the projection lens 115.

To the array shaped phase modulating part 101, a rectangular ac wave of frequency of 1 k Hz is applied. The amplitude of the rectangular ac wave applied to the low resistance electrodes 134a, 135b, 136a, 137b and 138a is modulated from 0.8 Vrms to 2.2 Vrms in time. The amplitude of the rectangular ac wave applied to the low resistance electrodes 134b, 135a, 136b, 137a and 138b is also modulated from 0.8 Vrms to 2.2 Vrms in time. At this time, the amplitudes of the rectangular ac waves are respectively modulated alternately in time. The potential of the opposed electrodes 131a to 131e falls to a ground.

In this example, since the lights whose phases are respectively modulated in the array shaped phase modulating part 101 are superposed together and projected on the screen 116, a high speckle canceling effect is recognized. Rectangular ac waves having different voltages and phases shifting by 180° are applied to the opposed electrodes 131a to 131e to further superpose phase modulated lights on the screen 116, so that a higher speckle canceling effect can be recognized.

INDUSTRIAL APPLICABILITY

As described above, the projection type display device according to the present invention can effectively simply reduce speckle noise when a light source having a coherent property and is advantageous as a display device or the like.

The invention claimed is:

1. A projection type display device, comprising:
a light emitting unit comprising a light source for emitting a coherent light;
an image light generating unit that modulates the coherent light emitted by the light emitting unit and generates an image light;
a projecting unit that projects the image light; and
a phase modulating unit positioned between the light emitting unit and the image light generating unit or between the image light generating unit and the projecting unit, the phase modulating unit comprising a first electrode, a second electrode, and a birefringent material layer comprising a liquid crystal layer positioned between the first electrode and the second electrode,
wherein the liquid crystal layer has liquid crystal molecules and at least one of the first electrode and the second electrode is configured to generate a gradient electric field such that at least one of a retardation value and an azimuth direction of a slow axis with respect to an optical axis of an incident light is distributed in different directions or values in a plane orthogonal to the optical axis in accordance with the gradient electric field generated between the first electrode and the second electrode.

2. The projection type display device according to claim 1, wherein the azimuth direction of the slow axis is constant in the plane orthogonal to the optical axis and the retardation value is distributed in different values within a range from a minimum retardation value to a maximum retardation value, and a difference between the maximum retardation value and the minimum retardation value is a wavelength of the coherent light or more.

3. The projection type display device according to claim 1, wherein the azimuth direction of the slow axis is distributed in the different directions in the plane orthogonal to the optical axis.

4. The projection type display device according to claim 3, wherein the azimuth direction of the slow axis is directed to a radial direction or a circumference direction of a concentric circle having the optical axis as a center in the plane orthogonal to the optical axis.

5. The projection type display device according to claim 3, wherein the retardation value is a constant value equal to a value odd number times as large as a half wavelength of the coherent light.

6. The projection type display device according to claim 2, wherein the first electrode and the second electrode are configured to generate the gradient electric field by applying a voltage to a portion of the liquid crystal layer.

7. The projection type display device according to claim 6, wherein the phase modulating unit is configured such that the first electrode and the second electrode apply the voltage which changes in time.

8. The projection type display device according to claim 2, wherein the liquid crystal molecules have positive dielectric anisotropy.

9. The projection type display device according to claim 1, wherein at least one of the first electrode and the second electrode comprises a low resistance electrode portion and a high resistance electrode portion.

10. The projection type display device according to claim 1, wherein at least one of the first electrode and the second electrode comprises a plurality of electrode portions, and the plurality of electrode portions are connected to a plurality of power sources, respectively.

11. The projection type display device according to claim 1, wherein at least one of the first electrode and the second electrode comprises a plurality of electrode portions forming a concentric circle having the optical axis as a center in the plane orthogonal to the optical axis.

12. The projection type display device according to claim 1, wherein at least one of the first electrode and the second electrode comprises a dielectric member configured to generate the gradient electric field.

13. An optical phase modulator, comprising:
a first electrode;
a second electrode facing the first electrode; and
a birefringent material layer comprising a liquid crystal layer positioned between the first electrode and the second electrode, the liquid crystal layer comprising liquid crystal molecules and having an array structure in a plane orthogonal to an optical axis of an incident light such that a phase of the incident light is modulated by elements of the array structure; and
an optical shaping device that divides the incident light into a plurality of light fluxes respectively corresponding to the elements and superposes the divided light fluxes on one light flux,
wherein at least one of the first electrode and the second electrode is configured to generate a gradient electric field between the first electrode and the second electrode such that at least one of a retardation value and an azimuth direction of a slow axis with respect to the optical axis varies in the liquid crystal layer with respect to the plane orthogonal to the optical axis of the incident light in accordance with the gradient electric field generated between the first electrode and the second electrode.

14. The optical phase modulator according to claim 13, wherein the retardation values in the liquid crystal layer are changed in time by a voltage applied to a portion of the liquid crystal layer by the electrodes.

15. A projection type display device, comprising:
a light emitting unit comprising a light source for emitting a coherent light;
an image light generating unit that modulates the light emitted by the light emitting unit to generate an image light;
a projecting unit that projects the image light; and
an optical phase modulator comprising a first electrode, a second electrode facing the first electrode and a birefringent material layer comprising a liquid crystal layer positioned between the first electrode and the second electrode, the liquid crystal layer comprising liquid crystal molecules and having an array structure in a plane orthogonal to an optical axis of an incident light such that a phase of the incident light is modulated by elements of the array structure,
wherein the optical phase modulator further comprises an optical shaping device that divides the incident light into a plurality of light fluxes respectively corresponding to the elements and superposes the divided light fluxes on one light flux, at least one of the first electrode and the second electrode is configured to generate a gradient electric field between the first electrode and the second electrode such that at least one of a retardation value and an azimuth direction of a slow axis with respect to the optical axis varies in the liquid crystal layer with respect to the plane orthogonal to the optical axis of the incident light in accordance with the gradient electric field generated between the first electrode and the second electrode, and the optical phase modulator is positioned between the light emitting unit and the image light generating unit or between the image light generating unit and the projecting unit.

* * * * *